(12) United States Patent
Kar et al.

(10) Patent No.: US 9,068,782 B2
(45) Date of Patent: Jun. 30, 2015

(54) TUBE-SIDE SEQUENTIALLY PULSABLE-FLOW SHELL-AND-TUBE HEAT EXCHANGER APPRATUS, SYSTEM, AND METHOD

(75) Inventors: Kishore K. Kar, Midland, MI (US);
Richard F. Cope, Midland, MI (US);
Quan Yuan, Lake Jackson, TX (US);
Madan Somasi, Midland, MI (US);
Brian M. Morgan, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 971 days.

(21) Appl. No.: 12/725,843

(22) Filed: Mar. 17, 2010

(65) Prior Publication Data

US 2010/0243208 A1   Sep. 30, 2010

Related U.S. Application Data

(60) Provisional application No. 61/210,302, filed on Mar. 17, 2009.

(51) Int. Cl.
*F28G 1/12* (2006.01)
*F28F 13/02* (2006.01)
*B29C 47/88* (2006.01)
*F28D 7/00* (2006.01)
(Continued)

(52) U.S. Cl.
CPC . *F28D 7/16* (2013.01); *B01J 8/067* (2013.01);
*B01J 19/1825* (2013.01); *B01J 2208/00221* (2013.01); *B01J 2219/00085* (2013.01); *B01J 2219/00162* (2013.01); *B01J 2219/182*
(2013.01); *B01J 2219/185* (2013.01); *F28F 13/125* (2013.01); *F28F 19/00* (2013.01); *F28F 2250/08* (2013.01)

(58) Field of Classification Search
CPC ............ F28D 7/16; F28D 7/163; F28D 9/00;
F28D 9/005; F28D 9/02; F28D 9/0236;
F28D 9/24; F28F 13/02; F28F 13/10; F28F
13/125
USPC ............... 165/109.1, 120, 159, 162; 422/135,
422/176, 201, 205, 220, 224
See application file for complete search history.

(56) References Cited

U.S. PATENT DOCUMENTS 1,581,545 A * 4/1926 Prache .................... 159/47.1
2,380,245 A * 7/1945 Keith et al. ................. 422/618
(Continued)

FOREIGN PATENT DOCUMENTS

DE          806441         6/1951
DE          898917         12/1953
(Continued)

OTHER PUBLICATIONS

Chen et al., "Applications of the Strong Heat Transformation by Pulse Flow in the Shell and Tube Heat Exchanger", HVAC Technologies for Energy Efficiency, vol. IV-6-3, ICEBO2006, Shenzhen, China.
(Continued)

*Primary Examiner* — Allen Flanigan
*Assistant Examiner* — Jason Thompson

(57) ABSTRACT

The present invention relates to a tube-side sequentially pulsable-flow, shell-and-tube heat exchanger apparatus and a chemical processing system comprising and methods of heat exchange employing the same.

12 Claims, 7 Drawing Sheets

(51) Int. Cl.
*F28D 7/16* (2006.01)
*B01J 8/06* (2006.01)
*B01J 19/18* (2006.01)
*F28F 13/12* (2006.01)
*F28F 19/00* (2006.01)

(56) References Cited

U.S. PATENT DOCUMENTS

| | | | |
|---|---|---|---|
| 2,416,760 A | | 3/1947 | Lawler et al. |
| 2,801,824 A | * | 8/1957 | Taprogge ............... 165/95 |
| 3,021,117 A | * | 2/1962 | Taprogge ............... 165/95 |
| 3,681,200 A | | 8/1972 | Ridgway, Jr. |
| 3,759,318 A | | 9/1973 | Putney et al. |
| 3,965,975 A | | 6/1976 | Edmundson |
| 4,029,143 A | * | 6/1977 | Goebel ............... 165/109.1 |
| 4,133,184 A | * | 1/1979 | Bivins, Jr. ............... 62/49.1 |
| 4,823,866 A | | 4/1989 | Hunt |
| 4,887,664 A | * | 12/1989 | Nehrbauer ............... 165/76 |
| 5,379,832 A | | 1/1995 | Dempsey |
| 6,084,125 A | | 7/2000 | Kingsley et al. |
| 6,502,590 B1 | | 1/2003 | DeBartolo et al. |
| 6,955,461 B2 | * | 10/2005 | Kar et al. ............... 366/196 |
| 2003/0111210 A1 | * | 6/2003 | Tsujita et al. ............... 165/51 |
| 2003/0178187 A1 | * | 9/2003 | Wanni et al. ............... 165/162 |
| 2005/0262850 A1 | * | 12/2005 | Knight et al. ............... 60/782 |
| 2007/0107884 A1 | * | 5/2007 | Sirkar et al. ............... 165/133 |
| 2008/0073063 A1 | * | 3/2008 | Clavenna et al. ............... 165/84 |
| 2008/0142190 A1 | * | 6/2008 | Chang et al. ............... 165/44 |

FOREIGN PATENT DOCUMENTS

| | | |
|---|---|---|
| DE | 19723322 A1 | 12/1998 |
| EP | 2077428 | 7/2009 |
| EP | 2077428 A2 * | 7/2009 |
| GB | 1242452 | 7/1968 |

OTHER PUBLICATIONS

Masterclass: Shell & Tube Evaporators—Part 16, ACR-news.com, Apr. 1, 2007, Faversham House Group Ltd., South Croydon, United Kingdom.

* cited by examiner

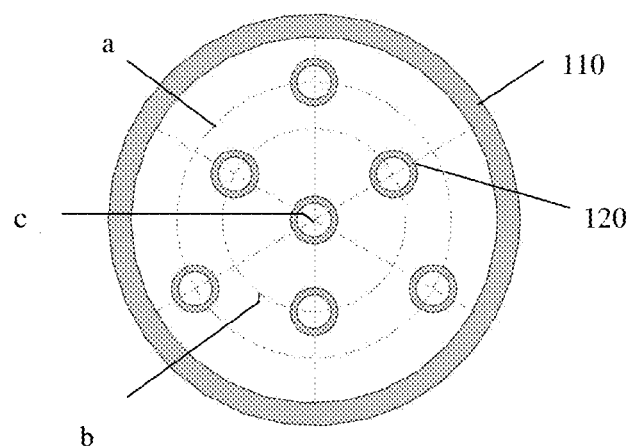
Fig. 7
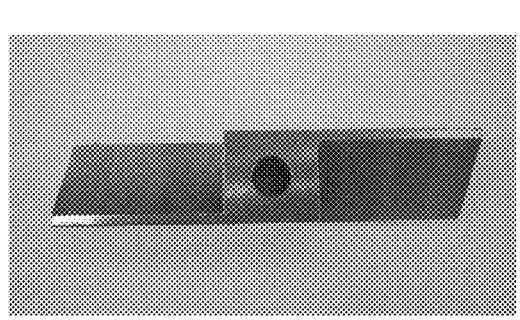 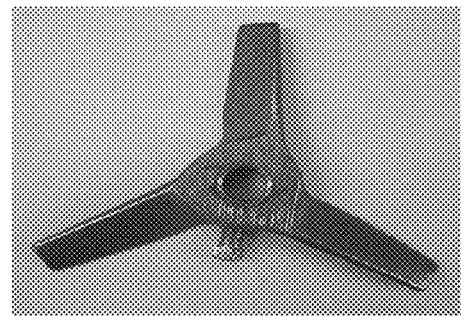
Fig. 8a  Fig. 8b
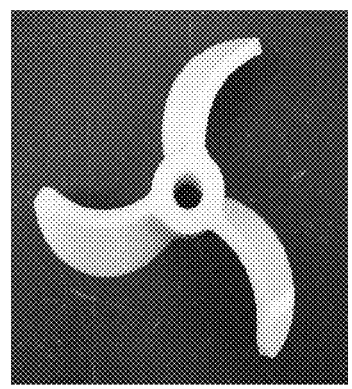
Fig. 8c

US 9,068,782 B2

TUBE-SIDE SEQUENTIALLY PULSABLE-FLOW SHELL-AND-TUBE HEAT EXCHANGER APPRATUS, SYSTEM, AND METHOD

CROSS-REFERENCE TO RELATED APPLICATIONS

This application claims benefit of U.S. Provisional Patent Application No. 61/210,302, filed 17 Mar. 2009, the entire contents of which are hereby incorporated herein by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to a tube-side sequentially pulsable-flow, shell-and-tube heat exchanger apparatus and a chemical processing system comprising and methods of heat exchange employing the same.

2. Description of the Related Art

U.S. Pat. No. 3,681,200 mentions a vertically oriented, impeller containing "shell-and-tube fermentor." U.S. Pat. No. 6,084,125 mentions a vertically oriented, impeller containing "shell-and-tube reactor." U.S. Pat. Nos. 3,759,318 and 3,965,975 each mention a type of horizontally oriented, impeller containing "mixing device" comprising a plurality of tubes. U.S. Pat. No. 4,823,866 mentions an impeller-containing "stirred vessel" that also contains a heat exchanger apparatus comprising a plurality of tubes. U.S. Pat. No. 5,379,832 mentions a "shell and coil heat exchanger." All of the aforementioned shell-and-tube fermentor, shell-and-tube reactor, mixing devices, stirred vessel, and shell and coil heat exchanger lack pulsed flow capability. Chen, Y. and Zhao, J. mention *Applications of the Strong Heat Transformation by Pulse Flow in the Shell and Tube Heat Exchanger*, HVAC Technologies for Energy Efficiency, Vol. IV 6-3, ICEBO2006, Shenzhen, China. A pulsed solenoid valve device for modulating refrigerant flow in a water chiller or water chiller evaporator is mentioned in *Masterclass: Shell & Tube Evaporators-Part 16*, ACR-news.com, Apr. 1, 2007, Faversham House Group Ltd., South Croydon, United Kingdom. A drawback of the pulsed solenoid valve device is that it works by stopping and restarting the entire refrigerant flow in an all or nothing paradigm. Detrimental effects of such stopping and restarting include a lower overall refrigerant flow rate than would be achievable under same conditions but lacking the stopping feature and an increased likelihood that heterogeneous material (e.g., contaminants) in the refrigerant will settle into a hold-up void when flow is stopped, and thereby foul the water chiller.

U.S. Pat. No. 6,955,461 B2 mentions a tickler impeller and agitation system for use in slurry reactors and storage tanks.

Fouling of tubes and concomitant reduction of heat exchange efficiency in conventional shell-and-tube heat exchangers still plagues industries that employ such heat exchangers. Such an improved heat exchanger would be especially useful for fouling-prone process fluids such as, for example, heterogeneous process fluids comprising a liquid component and a fouling component (e.g., a contaminant or process component) that is a particulate solid, an insoluble second liquid, or both; or a liquid reactant (e.g., monomer) prone to create a solid (e.g., by precipitation of a component dissolved therein or by reaction (e.g., polymerization) to produce an insoluble product), and thereby foul the tubes. The chemical industry, in particular, desires a shell-and-tube heat exchanger with improved operating performance such as, for example, an enhanced heat transfer rate, decreased tube fouling rate, or both. Ideally, the improved shell-and-tube heat exchanger would operate by maintaining an average (overall) flow rate of process fluid and only locally vary tube-specific flow rates of a fouling-prone process fluid moving through the tubes. Further, it would be desirable if the improved shell-and-tube heat exchanger inhibits agglomeration of solids in a slurry or dispersion process fluid, especially agglomeration in an inlet plenum, tubes, outlet plenum, or a combination thereof of the improved shell-and-tube heat exchanger.

BRIEF SUMMARY OF THE INVENTION

In a first embodiment, the present invention provides a tube-side sequentially pulsable-flow, shell-and-tube heat exchanger apparatus comprising a shell-and-tube heat exchanger and a means for sequentially pulsing a plurality of liquid flows therein, wherein the shell-and-tube heat exchanger contains a plurality of tubes, the tubes being open-ended and defining enclosed volumetric spaces between the open ends thereof, and a portion of the heat exchanger apparatus defines a shell-side flow pathway therethrough and another portion of the heat exchanger apparatus defines a tube-side flow pathway therethrough, the tube-side flow pathway comprising the enclosed volumetric spaces of the tubes, and the means for sequentially pulsing a plurality of liquid flows being in sequentially pulsable fluid communication with the enclosed volumetric spaces of at least two of the tubes.

For simplicity, the tube-side sequentially pulsable-flow, shell-and-tube heat exchanger apparatus is also referred to herein as the heat exchanger apparatus of the first embodiment or invention heat exchanger apparatus.

In a first preferred aspect of the shell-and-tube heat exchanger apparatus of the first embodiment:

(a) the portion of the shell-and-tube heat exchanger that defines the shell-side flow pathway comprises a shell defining spaced-apart shell-side fluid inlet and outlet conduits and an enclosed volumetric space, the shell-side fluid inlet conduit being in sequential fluid communication with the enclosed volumetric space of the shell and the shell-side fluid outlet conduit, thereby establishing the shell-side flow pathway;

(b) the portion of the shell-and-tube heat exchanger that defines the tube-side flow pathway comprises spaced-apart tube-side inlet and outlet portions and the plurality of tubes, the tube-side inlet portion defining a tube-side fluid inlet conduit and an inlet plenum, the tube-side outlet portion defining a tube-side fluid outlet conduit and an outlet plenum, the tubes having walls and spaced-apart inlet and outlet ends respectively defining inlet and outlet apertures therein, the walls of the tubes defining the enclosed volumetric spaces thereof and having inner diameters, the tubes being spaced apart from each other and contained within the enclosed volumetric space of the shell, the tube-side fluid inlet conduit being in sequential fluid communication with: the inlet plenum; the inlet apertures, enclosed volumetric spaces, and outlet apertures of the tubes; the outlet plenum; and the tube-side fluid outlet conduit, thereby establishing the tube-side flow pathway; and (c) the means for sequentially pulsing a plurality of liquid flows, or at least a pulse-effecting portion thereof, is disposed in the inlet plenum of the inlet portion of the shell-and-tube heat exchanger such that a nearest portion of the means for sequentially pulsing a plurality of liquid flows, or the pulse-effecting portion thereof, is within an unobstructed pulsing-effective distance from the inlet apertures of the inlet ends of the tubes, thereby establishing sequentially pulsable fluid communication between the means for sequentially pulsing a plurality of liquid flows, or the pulse-effecting portion thereof, and, successively, the inlet apertures of the inlet ends of the tubes, the enclosed volumetric spaces of the tubes, and the outlet apertures of the outlet ends of the tubes.

Where the means for sequentially pulsing a plurality of liquid flows traverses from the inlet plenum through the tube-side inlet portion of the portion that defines the tube-side flow pathway of the shell-and-tube heat exchanger to an exterior of the shell-and-tube heat exchanger, preferably the tube-side inlet portion further defines an access conduit so as to establish a pathway for said traversing of the tube-side inlet portion of the tube-side flow pathway of the shell-and-tube heat exchanger.

In a second embodiment, the present invention provides a chemical processing system comprising a means for heat exchange between a process fluid and a heat exchange fluid, the means for heat exchange comprising:

the heat exchanger apparatus of the first embodiment;
a source of the process fluid;
a process fluid effluent receiving means;
a source of the heat exchange fluid; and
a heat exchange fluid effluent receiving means, wherein the source of the heat exchange fluid is in sequential fluid communication with the shell-side flow pathway in the heat exchanger apparatus and the heat exchange fluid effluent receiving means; the source of the process fluid is in sequential fluid communication with the tube-side flow pathway in the heat exchanger apparatus and the process fluid effluent receiving means; the shell-side and tube-side flow pathways are in indirect heat exchange communication with each other via the walls of the tubes; and the shell-side and tube-side flow pathways lack fluid communication with each other.

In a first preferred aspect of the chemical processing system of the second embodiment, the means for heat exchange comprises the first preferred aspect of the heat exchanger apparatus of the first embodiment.

The source of the heat exchange fluid and the heat exchange fluid effluent receiving means may be the same or different and the source of the process fluid and the process fluid effluent receiving means may be the same or, preferably, different.

In a third embodiment, the present invention provides a method of exchanging heat between a process fluid and a heat exchange fluid, the method comprising steps of:

(a) Providing the chemical processing system of the second embodiment;

(b) Passing the heat exchange fluid from the source of the heat exchange fluid through the shell-side flow pathway of the heat exchanger apparatus to the heat exchange fluid effluent receiving means, all of the chemical processing system, thereby establishing a shell-side flow of the heat exchange fluid through the heat exchanger apparatus;

(c) Simultaneously with step (b), pushing the process fluid from the source of the process fluid through the tube-side flow pathway of the heat exchanger apparatus to the process fluid effluent receiving means, all of the chemical processing system, thereby establishing a tube-side flow at an average (overall) flow rate of the process fluid through the heat exchanger apparatus, wherein each tube independently is characterized as having a tube-specific flow rate of the process fluid therethrough; and (d) Sequentially pulsing the tube-side flow of the process fluid through the enclosed volumetric spaces of the tubes of the heat exchanger apparatus of the chemical processing system, the pushing and sequentially pulsing together thereby establishing a plurality of sequentially-pulsed, tube-side flows of the process fluid through the enclosed volumetric spaces of the tubes and steps (b) and (c) together establishing an indirect exchange of heat between the process fluid and the heat exchange fluid via the walls of the tubes of the heat exchanger apparatus.

Preferably, step (d) changes (increases or decreases) the average flow rate by less than 5 percent, more preferably by less than 2 percent, still more preferably by less than 1 percent, and even more preferably does not change the average flow rate.

Operation of the heat exchanger apparatus produces the tube-side sequentially pulsed-flow of the process fluid through the tubes (i.e., through the enclosed volumetric spaces of the tubes from inlet to outlet apertures thereof) and, thereby, provides, among other things, improved heat exchange rates between the heat exchange fluid and the process fluid and decreased fouling of at least some, preferably all, the tubes, especially when employing fouling prone process fluids (e.g., suspensions and mixtures comprising a polymerizable reactant such as an unsaturated olefin (e.g., acrylic acid)). The improved heat exchange rates and decreased fouling of the present invention are when compared to heat exchange rates and fouling of a comparable shell-and-tube heat exchanger that is lacking the means for sequentially pulsing a process fluid through tubes thereof. The heat exchanger apparatus of the first embodiment operates by maintaining the average (overall) flow rate of the process fluid and only locally varies tube-specific flow rates of the process fluid moving through the tubes. Further, when the fouling prone process fluid comprises a suspension of solid particles in a liquid (e.g., a slurry or dispersion), pulsing of flow of process fluid may inhibit agglomeration of the solid particles or, perhaps, effect deagglomeration of any undesirably agglomerated solid particles in the inlet plenum before the solid particles enter the tubes (e.g., by way of mechanical action of the means for sequentially pulsing a plurality of liquid flows), while the solid particles are in the tubes, in the outlet plenum after the solid particles have exited the tubes (e.g., by way of increased turbulence of contents in the outlet plenum), or a combination thereof.

Additional embodiments are described in accompanying drawings and the remainder of the specification, including the claims.

BRIEF DESCRIPTION OF THE DRAWING(S)

Some embodiments of the present invention are described herein in relation to the accompanying drawings, which will at least assist in illustrating various features of the embodiments.

Figure 3:
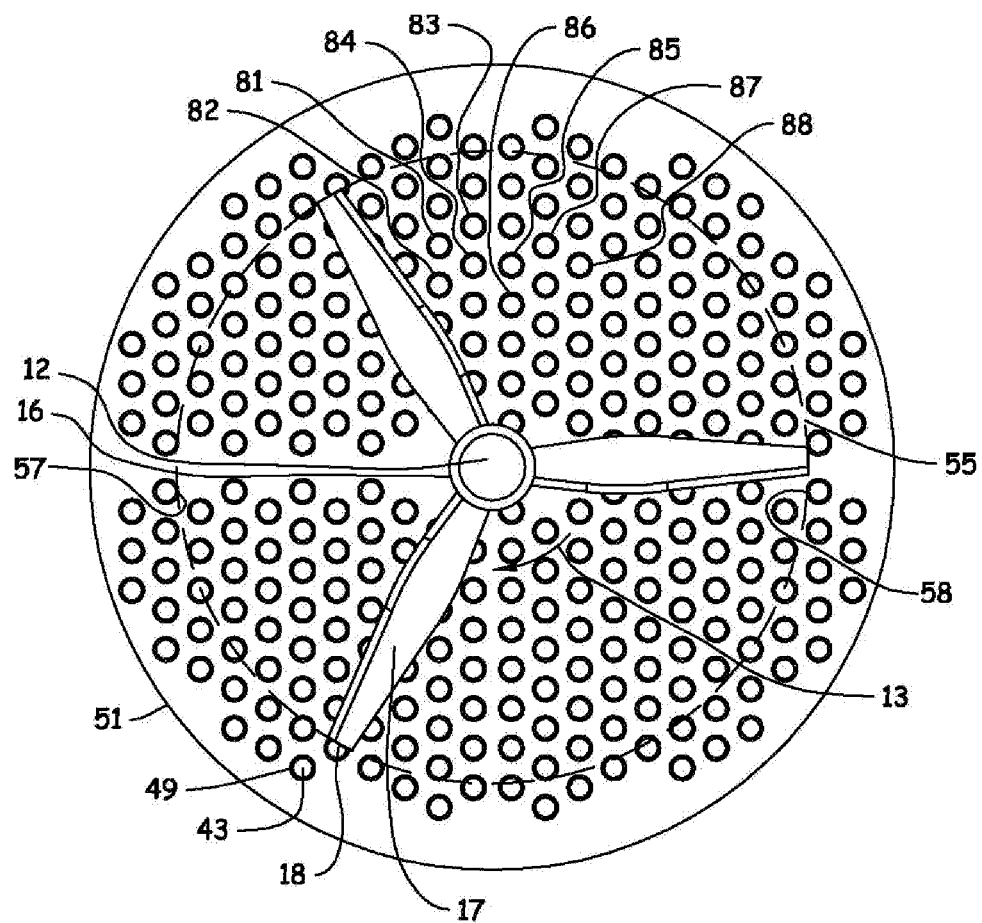

FIG. 3 shows a cut away, axial-oriented view of heat exchanger apparatus 1 showing impeller 16 and behind it, tube sheet 51.

Figure 4:
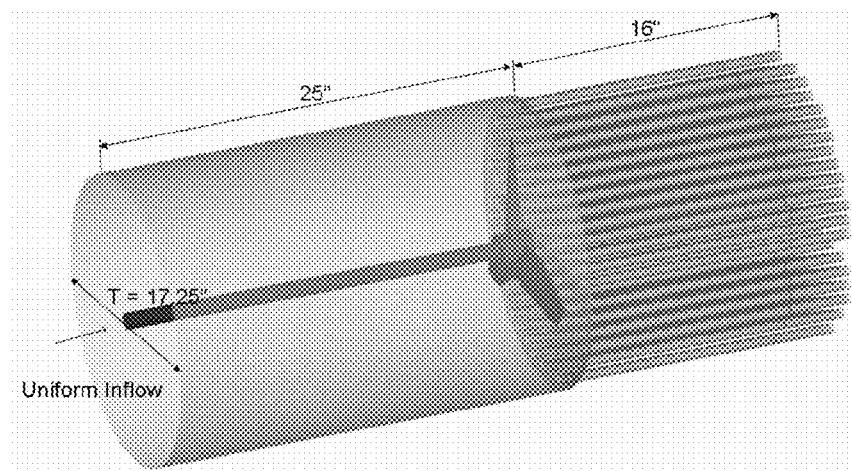

FIG. 4 displays dimensions of a modeled full-scale heat exchanger apparatus as preformed using Computational Fluid Dynamics (CFD) simulation and a Lightnin impeller A310.

Figure 5:
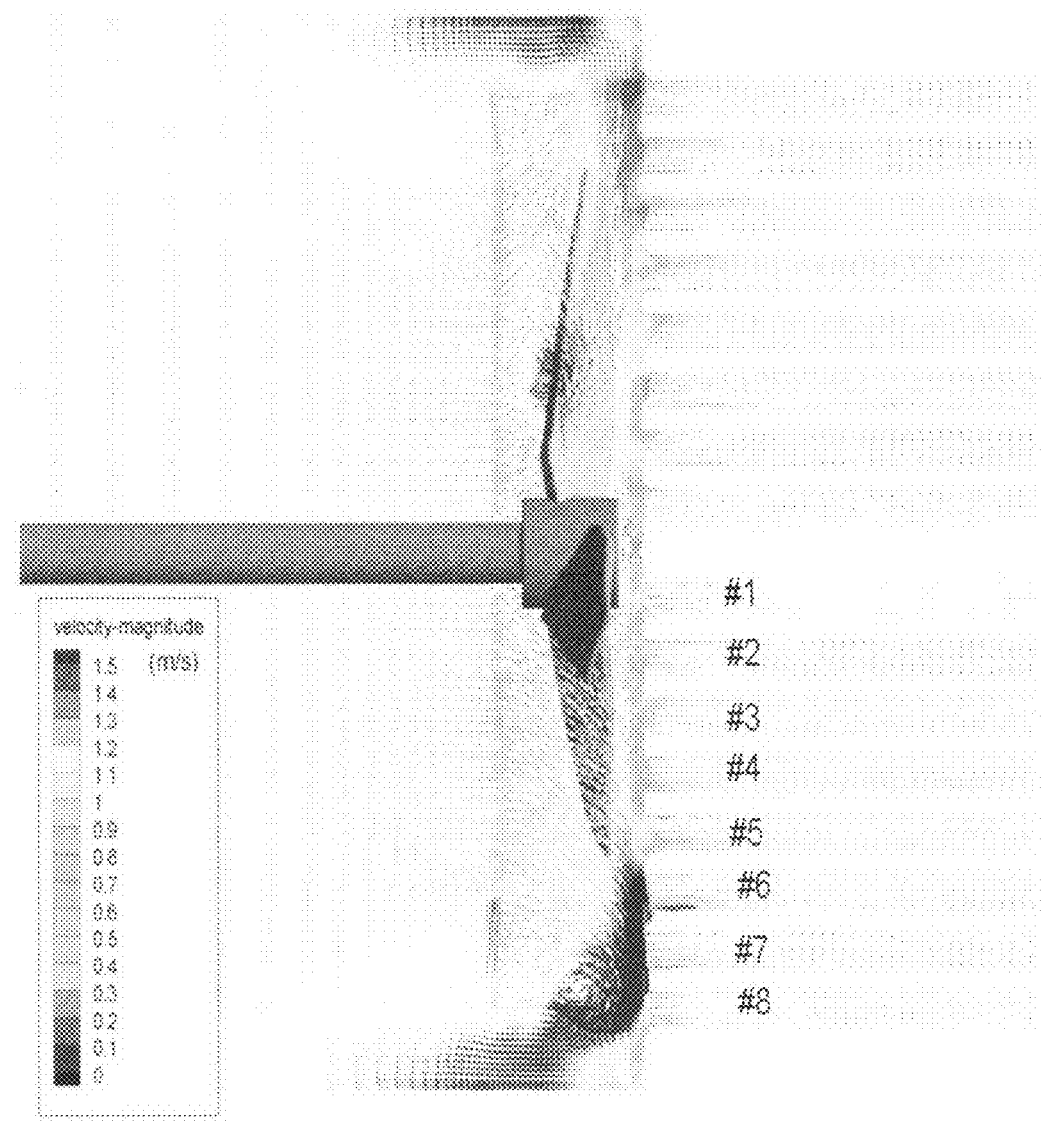

FIG. 5 illustrates grayscale instantaneous flow velocity vector results at center plane crossing tube numbers 1 to 8 for the CFD simulation modeled in FIG. 4.

Figure 6A:
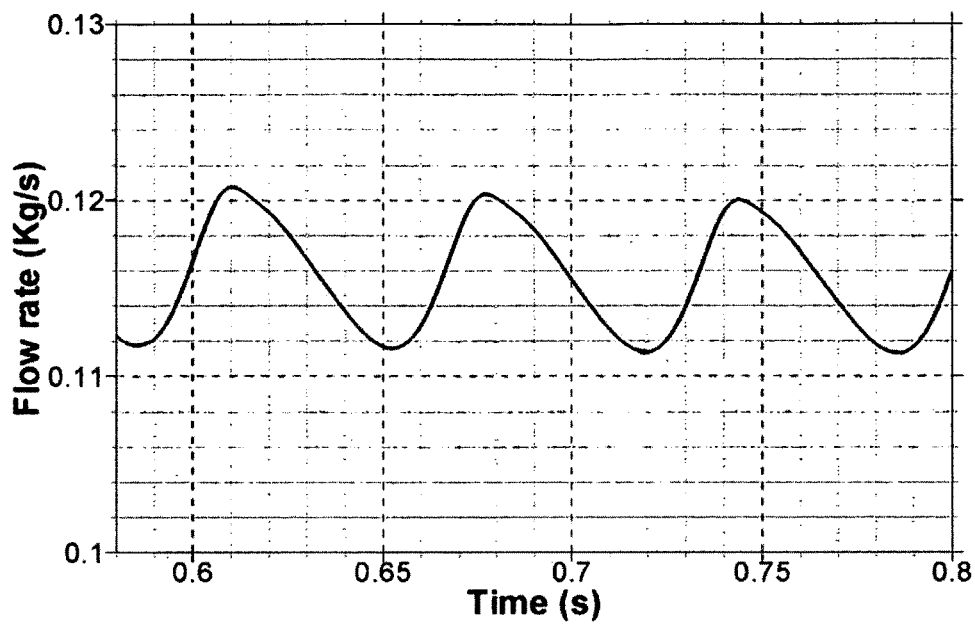
Figure 6B:
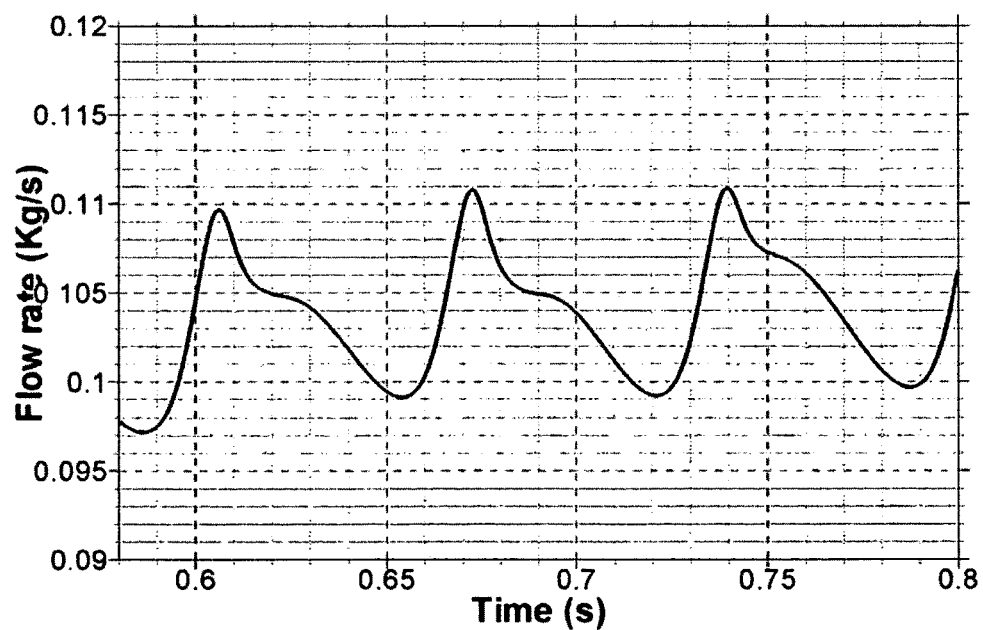

FIGS. 6a and 6b illustrate simulated time-variation of flow rates through two tubes (numbers 4 and 6, respectively in FIG. 5) with different distances from theoretical centerline of the heat exchanger apparatus.

FIG. 7 shows a preferred arrangement of seven tubes, which are arranged in two concentric rings of three tubes each and a single center tube as used in Example 2.

FIG. 8a shows a photograph of the pitched blade turbine used in Example 2.

FIG. 8b shows a photograph of the Lightnin A310 impeller used in Example 2.

FIG. 8c shows a photograph of the KT-3 tickler impeller used in Example 2.

DETAILED DESCRIPTION OF THE INVENTION

Figure 1:
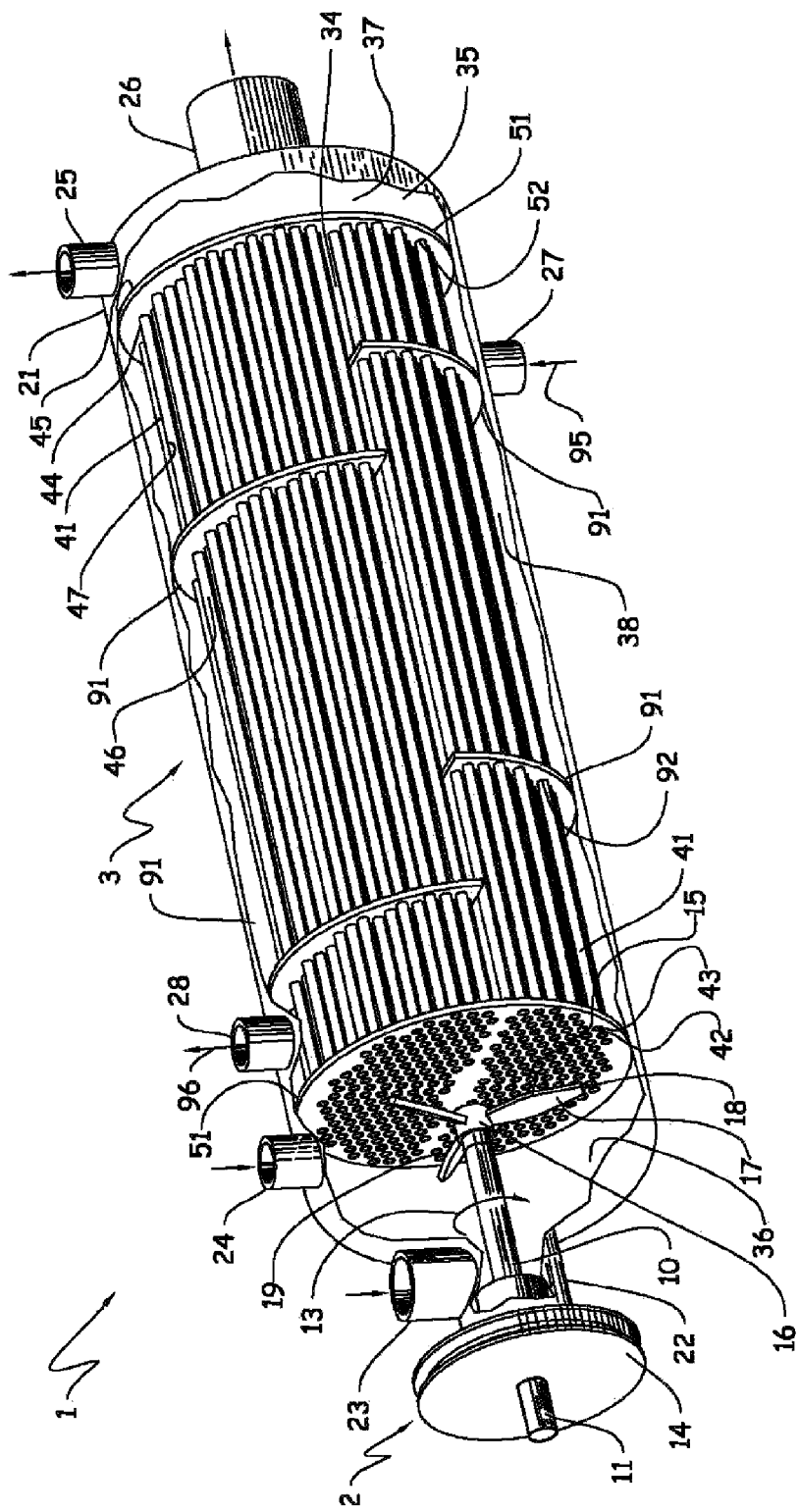
FIG. 1 illustrates a perspective view of a preferred heat exchanger apparatus of the first embodiment.

FIG. 1 shows a perspective view of an example of a preferred heat exchanger apparatus 1. In FIG. 1, heat exchanger apparatus 1 comprises impeller assembly 2 and shell-and-tube heat exchanger 3. The impeller assembly 2 (an example of the means for sequentially pulsing a plurality of liquid flows) comprises rotatable shaft 10, bearing assembly 14, and impeller 16. The rotatable shaft 10 is theoretically characterized by an axis (not indicated) between spaced-apart drive element-receiving portion 11 and impeller element-receiving portion 12 (hidden within impeller 16; see FIG. 3). Impeller 16 has three blades 17. Each blade 17 has outer tip 18 and unopposed surface 19, which generally faces away from drive element-receiving portion 11. Each blade 17 is approximately perpendicular to rotatable shaft 10 and is pitched out of a theoretical plane oriented perpendicular to the axis (not indicated) of rotatable shaft 10. Impeller 16 is in operative connection to rotatable shaft 10 at impeller element-receiving portion 12 (hidden within impeller 16; see FIG. 3). Impeller 16 comprises a pulse-effecting portion (not indicated) of impeller assembly 2. Bearing assembly 14 has a portion (not indicated) defining a shaft receiving aperture (not indicated) and has an exterior contacting surface (not indicated), the portion (not indicated) defining the shaft receiving aperture (not indicated) being in sealing, low-friction operative contact to rotatable shaft 10 proximal to drive element-receiving portion 11 of rotatable shaft 10. Rotating rotatable shaft 10, preferably without rotating bearing assembly 14, provides 360-degree turning of rotatable shaft 10 and, thus, 360-degree sweeping of blades 17.

The shell-and-tube heat exchanger 3 of FIG. 1 comprises pressure vessel body 21 (also referred to herein as a shell), a plurality of tubes 41, two tube sheets 51, and four baffles 91. Pressure vessel body 21 has a tube-side conduit portion (not indicated) comprising: shaft access conduit 22, fluid inlet conduit 24, fluid outlet conduit 25, and fluid outlet conduit 26. Shaft access conduit 22 has fluid inlet conduit 23. Pressure vessel body 21 also has a shell-side conduit portion (not indicated) comprising: fluid inlet/outlet conduits 27 and 28 (i.e., 27 is a fluid inlet conduit and 28 is a fluid outlet conduit or vice versa). The conduits 22 to 28 are shown in FIG. 1 as comprising outwardly protruding portions of the pressure vessel body 21. (The present invention also contemplates a pressure vessel body (not shown) having one or more conduits (not shown) that are flush portions (not shown) or inwardly protruding portions (not shown) thereof.) Pressure vessel body 21 defines enclosed volumetric space 35. Enclosed volumetric space 35 is divided by tube sheets 41 into inlet plenum 36, outlet plenum 37, and shell-side portion 38 such that shell-side portion 38 is spaced apart from both inlet plenum 36 and outlet plenum 37 of enclosed volumetric space 35. Fluid inlet/outlet conduits 27 and 28 and shell-side portion 38 of enclosed volumetric space 35 establish a shell-side flow pathway (not indicated). Fluid inlet conduits 23 and 24, inlet plenum 36, tubes 41, outlet plenum 37, and fluid outlet conduits 25 and 26 establish a tube-side flow pathway (not indicated). The shell-side and tube-side flow pathways (not indicated) lack fluid communication with each other when the shell-and-tube heat exchanger 3 is operating.

The plurality of tubes 41 of FIG. 1 are disposed within enclosed volumetric space 35 of, and spaced apart from, pressure vessel body 21 of the shell-and-tube heat exchanger 3 and are spaced apart from, and are generally parallel to, each other. Each tube 41 has a wall 47, an inlet end 42 and outlet end 44. Wall 47 defines enclosed volumetric space 46 in tube 41. Each inlet end 42 defines inlet aperture 43 and each outlet end 44 defines inlet aperture 45. Each tube 41 establishes fluid communication between its inlet aperture 43 and outlet aperture 45. Each tube 41 preferably has an aspect ratio (not indicated) of length (between inlet aperture 43 and outlet aperture 45) to inner diameter d (not indicated) at least 10, more preferably at least 25, still more preferably at least 50, and even more preferably at least 100.

The number of tubes 41 (i.e., the numerical value for the plurality thereof) in the shell-and-tube heat exchanger 3 of FIG. 1 is not critical. In FIG. 1, the plurality of tubes 41 comprises approximately 248 in number, disposed in half circle-oriented arrangements (not indicated) of about 124 in number each. The half circle-oriented arrangements (not indicated) are spaced apart from each other, creating horizontally-disposed portion 34 (see also FIG. 2) of shell-side portion 38 of enclosed volumetric space 35.

Each tube sheet 51 of the shell-and-tube heat exchanger 3 of FIG. 1 defines a plurality of apertures 52, wherein the plurality of apertures 52 in each tube sheet 51 equals the plurality of tubes 41. Each tube sheet 51 is disposed approximately parallel to and spaced apart from each other in enclosed volumetric space 35 of pressure vessel body 21. Each tube sheet 51 is in sealing operative contact with pressure vessel body 21 and with tubes 41, the latter sealing operative contact being at or proximal to inlet ends 42 or outlet ends 44 of tubes 41, thereby preventing fluid communication between shell-side portion 38 and inlet plenum 36 and outlet plenum 37 of enclosed volumetric space 35 of pressure vessel body 21.

Each baffle 91 of the shell-and-tube heat exchanger 3 of FIG. 1 defines a half circle shape and a plurality of apertures 92, wherein the plurality of apertures 92 equals one half of the plurality of tubes 41. Each baffle 91 is disposed approximately parallel to and spaced apart from each other and from tube sheets 51 in shell-side portion 38 of enclosed volumetric space 35 of pressure vessel body 21. Preferably, each baffle 91 is in sealing operative contact with pressure vessel body 21, tubes 41, or, more preferably, a combination thereof. Baffles 91 establish a means of establishing a tortuous fluid flow path in the aforementioned tube-side flow pathway (not indicated) between fluid inlet/outlet conduits 27 and 28, thereby improving contact of a heat exchange fluid with exterior surface (not indicated) of walls 47 of all tubes 41.

When the shell-and-tube heat exchanger 3 of FIG. 1 is constructed as described above, fluid inlet conduits 23 and 24 of pressure vessel body 21 can be used to independently establish fluid communication between the aforementioned source of process fluid (not shown) and inlet plenum 36 of enclosed volumetric space 35; tubes 51 independently establish fluid communication between inlet plenum 36 and outlet plenum 37; and fluid outlet conduits 25 and 26 can be used to independently establish fluid communication between outlet plenum 37 of enclosed volumetric space 35 and the aforementioned process fluid effluent receiving means (not shown), thereby ultimately establishing tube-side fluid communication between the source of process fluid (not shown) and the process fluid effluent receiving means (not shown) via the aforementioned tube-side flow pathway (not indicated). One of fluid inlet/outlet conduits 27 and 28 can be used to establish fluid communication between the aforementioned source of heat exchange fluid (not shown) and shell-side portion 38 of enclosed volumetric space 35 and the other of fluid inlet/outlet conduits 27 and 28 can be used to establish fluid communication between shell-side portion 38 of enclosed volumetric space 35 and the aforementioned heat exchange fluid effluent receiving means (not shown), thereby ultimately establishing shell-side fluid communication between the source of heat exchange fluid (not shown) and the heat exchange fluid effluent receiving means (not shown) via the aforementioned shell-side flow pathway (not indicated).

Assemble heat exchanger apparatus 1 of FIG. 1 from the previously described impeller assembly 2 and shell-and-tube heat exchanger 3 as follows. Dispose bearing assembly 14 of impeller assembly 2 within, and in sealing operative contact to, shaft access conduit 22 of pressure vessel body 21 such that and the exterior contacting surface (not indicated) is in operative contact to the tube-side inlet portion at the shaft access conduit 22, and dispose rotatable shaft 10 through, and in sealing operative contact with, bearing assembly 14 such that at least drive element-receiving portion 11 of rotatable shaft 10 is exterior to shell-and-tube heat exchanger 3. Dispose at least the pulse-effecting portion (comprising impeller 16) of rotatable shaft 10) of impeller assembly 2 in inlet plenum 36 of enclosed volumetric space 35 of pressure vessel body 21. Said latter disposition is such that a nearest portion 15 of blades 17 of impeller 16, which nearest portion 15 is also the nearest portion of impeller assembly 2, is disposed within an unobstructed pulsing-effective distance $D_{pe}$ (e.g., see 5 in FIG. 2) from at least some inlet apertures 43 of inlet ends 42 of tubes 41 so as to establish pulsable fluid communication between the pulse-effecting portion of impeller assembly 2 and, successively, inlet apertures 43 of inlet ends 42, enclosed volumetric space 46, and outlet apertures 45 of outlet ends 44, all five of tubes 41. The unobstructed pulsing-effective distance $D_{pe}$ (e.g., see 5 in FIG. 2) comprises an unobstructed (by any part of shell-and-tube heat exchanger 3) length of flow between the nearest portion (15) of nearest one of blades 17 to a nearest one of inlet ends 42 of tubes 41 that is less than or equal to 0.1 to 4.0 times an average of the inner diameters (not indicated) of inlet apertures 43 of inlet ends 42 of tubes 41. Preferably, inner diameters (not indicated) of inlet apertures 43 are the same as inner diameters (not indicated) of walls 47 of tubes 41. Further, said latter disposition is also such that blades 17 of impeller 16 are spaced apart from pressure vessel body 21 and a theoretical circle (e.g., see 55 in FIG. 3) circumscribed by a 360 degree sweep of an outermost one of outer tips 18 of blades 17 would encompass from at least 2 of inlet ends 42 of tubes 41 to all of the inlet ends 42 of tubes 41.

Before operating heat exchanger apparatus 1 of FIG. 1 in a method of the third embodiment, (A) establish rotating operative connection between an impeller driving means (not shown) and drive element-receiving portion 11 of rotatable shaft 10; and (B) independently establish operative fluid communication between (i) the source of heat exchange fluid (not shown) and one of fluid inlet/outlet conduits 27 and 28 of pressure vessel body 21 (27 for countercurrent flow, indicated by direction arrows 95 and 96, and 28 for co-current flow (not indicated)); (ii) between the other of fluid inlet/outlet conduits 27 and 28 of pressure vessel body 21 and the heat exchange fluid effluent receiving means (not shown) (28 for countercurrent flow, indicated by direction arrows 95 and 96, and 27 for co-current flow (not indicated)); (iii) between the source of process fluid (not shown) and fluid inlet conduits 23 and 24 of pressure vessel body 21; and (iv) between fluid outlet conduits 25 and 26 of pressure vessel body 21 and the means for receiving process fluid effluent (not shown), thereby establishing an operatively connecting and communicating preferred embodiment of the invention heat exchanger apparatus comprising heat exchanger apparatus 1. The source of heat exchange fluid (not shown) and the heat exchange fluid effluent receiving means (not shown) may be the same or different.

When operating the immediately aforementioned operatively connecting and communicating embodiment of the invention heat exchanger apparatus comprising heat exchanger apparatus 1 of FIG. 1 in a method of the third embodiment, preferably the method comprises steps of: (a) providing the operatively connecting and communicating embodiment of the invention heat exchanger apparatus comprising heat exchanger apparatus 1; (b) passing a heat exchange fluid from the source thereof (not shown) in through one of fluid inlet/outlet conduits 27 and 28 of pressure vessel 21 into shell-side portion 38 of enclosed volumetric space 35, around baffles 91 to and out of the other of fluid inlet/outlet conduits 27 and 28 to the heat exchange fluid effluent receiving means (not shown), thereby establishing the shell-side flow of the heat exchange fluid through the shell-side flow pathway of heat exchanger apparatus 1; (c) simultaneously with the passing step, pushing a process fluid at the aforementioned average flow rate from the source of process fluid (not shown) through fluid inlet conduits 23 and 24 into inlet plenum 36, through tubes 41 into outlet plenum 37, and out through fluid outlet conduits 25 and 26 to the process fluid effluent receiving means, thereby establishing a tube-side flow of the process fluid at the average flow rate through the tube-side flow pathway of heat exchanger apparatus 1; and (d) pulsing the tube-side flow of the process fluid through tubes 41 by rotating rotatable shaft 10 in clockwise direction indicated by direction arrow 13 and thus 360-degree sweeping of blades 17 in clockwise direction indicated by direction arrow 13, thereby establishing, between blades 17 and successively inlet apertures 43, through tubes 41, and outlet apertures 45, a sequentially pulsing tube-side flow of the process fluid through tubes 41, wherein the pushing step (c) and pulsing step (d) together thereby establishing a plurality of sequentially-pulsed, tube-side flows of the process fluid through tubes, and further with the passing step (b) thereby establishing an exchange of heat between the process fluid and the heat exchange fluid as described herein. Preferably, the method is characterized by the pushing step (c) producing a flow of the process fluid at an average flow rate and each of tubes 41 is characterized by an independent tube-specific flow rate such that the tube-specific flow rates in at least two tubes is from about 0.1 times to about 5.0 times the average flow rate. The tube-specific flow rate of process fluid through any one tube 41 may or may not vary over time and may be the same as or different from the tube-specific flow rate of process fluid in any other tube 41. Said operating of heat exchanger apparatus 1 produces tube-side sequentially pulsed-flow of the process fluid through tubes 41, especially through tubes 41 lying within a theoretical circle (not indicated; see, e.g., 55 of FIG. 3) traced by outer tips 18 of blades 17, and, thereby, provides, among other things, improved heat exchange rates between the heat exchange fluid and the process fluid via walls 47 of tubes 41 and decreased fouling rates in at least some, preferably all, tubes 41, especially in tubes 41 lying within the theoretical circle (not indicated; see, e.g., 55 of FIG. 3) traced by outer tips 18 of blades 17, especially when employing fouling prone process fluids. Further, when the fouling prone process fluid comprises a suspension of solid particles in a liquid, rotation of blades 17 may inhibit agglomeration of the solid particles or, perhaps, effect deagglomeration of any agglomerated solid particles, in inlet plenum 36 before the solid particles reach inlet apertures 43 of inlet ends 42 of tubes 41, in enclosed volumetric space 46 of tubes 41, in outlet plenum 37 after the solid particles exit tubes 41, or a combination thereof.

Alternative shell-and-tube heat exchanger arrangements other than shell-and-tube heat exchanger 1 of FIG. 1 are also preferred. In some embodiments, a preferred alternative shell-and-tube heat exchanger arrangement is the same as shell-and-tube heat exchanger 1 except it lacks fluid inlet conduit 23 or 24, but not both; or it lacks fluid outlet conduit 25 or 26, but not both; or it lacks baffles 91; or any combination thereof. Use of baffles 91 or functional equivalents thereof is preferred.

Figure 2:
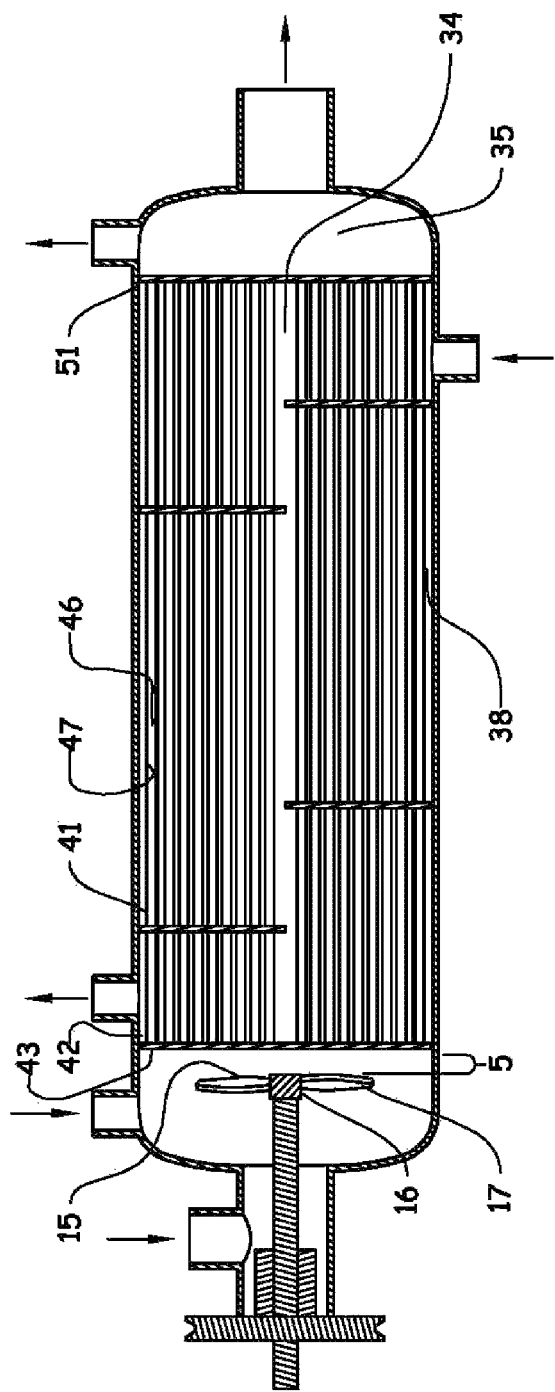
FIG. 2 illustrates an elevation view of the preferred heat exchanger apparatus of the first embodiment.

FIG. 2 shows an elevation view of heat exchanger apparatus 1. In FIG. 2, a nearest portion 15 of blades 17 of impeller 16 is disposed within a pulsing-effective distance $D_{pe}$ 5 from inlet apertures 43 of inlet ends 42 of at least some of tubes 41. Walls 47 define enclosed volumetric space 46 in each tube 41. As previously mentioned, the two spaced-apart half circle-oriented arrangements (not indicated) of tubes 41 are spaced apart from each other, creating horizontally-disposed portion 34 (see also FIG. 2) of shell-side portion 38 of enclosed volumetric space 35. Each tube sheet 51 has a diameter (not indicated) of about 43 centimeters. For convenience, lengths (not indicated) of tubes 41 are not drawn to scale in FIG. 2 (or FIG. 1) compared to diameters (not indicated) of tube sheets 51. Preferably, each tube 41 has a length (not indicated) that is twice as long (i.e., about 180 centimeters) as the length (not indicated) of about 90 centimeters depicted in FIG. 2 (and FIG. 1).

FIG. 3 shows a cut away, axial-oriented view of heat exchanger apparatus 1 looking from shaft conduit 22 that shows impeller element-receiving portion 12 of rotatable shaft 10 (see FIG. 1), impeller 16, nearest tube sheet 51, and annular faces 49 of inlet ends 42 (not indicated; see FIGS. 1 and 2) defining inlet apertures 43 of tubes 41 (not indicated; see FIGS. 1 and 2). Tubes 41 (not indicated; see FIGS. 1 and 2) are thus shown in FIG. 3 as being flush mounted in tube sheet 51. Positions of some of tubes 41 (not indicated) are shown as first positions 81 and 82, second positions 83 and 84, third positions 85 and 86, fourth position 87, and fifth position 88. Theoretical circle 55 is circumscribed by a 360-degree sweep (not shown) of outer tips 18 of blades 17. In some embodiments, theoretical circle 55 has straight line distance D (not indicated) between rightmost edge 57 of one of inlet apertures 43 of one of tubes 41 (not indicated; see FIGS. 1 and 2) and leftmost edge 58 of another of inlet apertures 43 of a different one of tubes 41 (not indicated; see FIGS. 1 and 2), straight line distance D (not indicated) being equal to 12.25 inches (31 centimeters) and inlet apertures 43 each having inner diameter d (not indicated) equal to 0.584 inches (1.48 centimeters).

Additional aspects (e.g., preferred materials) of the heat exchanger apparatus 1 of FIGS. 1 to 3 are described in following paragraphs. Further, the present invention contemplates alternative embodiments of heat exchanger apparatus 1 of FIGS. 1 to 3. For example, the present invention independently contemplates alternative array arrangements (e.g., complete circle and polygon (e.g., hexagon) arrangements) of tubes 41 other than the two spaced-apart half circle-oriented arrangements; alternative numbers (fewer or more) of apertures 52, and thus correspondingly alternative numbers of tubes 41, and preferably different inner diameters d 57 of apertures 52 (smaller or larger); different aspect ratios (length to inner diameter d 57) for tubes 41; alternative pressure vessel body 21 configurations (e.g., a 2- or 3-piece configuration wherein pressure vessel body 21 comprises a shell element and at least one header element as described later), and the like. Some of such alternative embodiments of heat exchanger apparatus 1 are further described in following paragraphs. Still further, the present invention contemplates alternative design embodiments of the heat exchanger apparatus of the first embodiment such as, for example, alternative 1-pass, or 2-, 3-, or 4-pass shell-and-tube designs. Such alternative design embodiments are also described in following paragraphs.

For purposes of United States patent practice and other patent practices allowing incorporation of subject matter by reference, the entire contents—unless otherwise indicated— of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, headings (e.g., "Definitions") are used for convenience and are not meant, and should not be used, to limit scope of the present disclosure in any way.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," preferably it means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination. The term "plurality" means two or more, wherein each plurality is independently selected unless indicated otherwise.

The term "conduit" means a portion defining an aperture and a means for operatively contacting, preferably being a means for operatively connecting, the means for operatively contacting being proximal to the aperture. Preferably, the aperture of the conduit is adjustable from a closed position to a fully open position, e.g., by way of an adjustable valve.

The term "enclosed volumetric space" means a 3-dimensional area largely bounded by element or elements which define the 3-dimensional area, which comprises an interior of the element(s). The element(s) preferably further define one or more apertures that allow fluid communication between the 3-dimensional area and another 3-dimensional area disposed exterior to the element(s).

The term "fluid" means a gaseous or liquid substance.

The term "low-friction" means easily movable, e.g., by stir motor or, preferably, by hand.

The phrase "operative contact" means direct or indirect touching of two elements (e.g., 10 and 14 in FIG. 1), wherein the elements may or may not also be in operative connection with each other. Form of the operative contact is not critical as long as it provides satisfactory touching of the two elements (e.g., maintains the two elements in same positions relative to each other, other than perhaps, for example, rotation of one element relative to the other element or some flexing of the elements toward and away from each other in response to a motive force). Suitable forms of operative contact are known in the art. Examples of operative contact without operative connection are a close tolerance fit and a friction fit. The close tolerance fit may or may not employ a lubricant or grease between the two elements. An example of a useful lubricant is a stir shaft/bearing silicone-based lubricant.

The term "operative connection" means direct or indirect secure joining of two elements to each other via any one or more of a variety of securing means. Choice of the securing means is not critical as long as it provides satisfactory operative connection (e.g., maintains the two elements in same positions relative to each other, other than perhaps some flexing of the elements toward and away from each other in response to a motive force). Suitable securing means are known in the art. Examples of suitable securing means are adhesives, clamps, fastening means such as pins, screws, rivets, dowel pins, and other mechanical fasteners. A preferred securing means for operatively connecting two elements together comprises a plurality of annularly-disposed apertures in each of the two elements and externally screw-threaded bolts and complementary internally screw-threaded nuts, wherein each externally screw-threaded bolt is disposed through a different pair of opposing annularly-disposed apertures in the two elements and is secured therein by one of the complementary internally screw-threaded nuts.

The term "process fluid" means a substance comprising a liquid. The substance may be characterized as being a heterogeneous-phase material or homogeneous phase material. Examples of such a substance are a neat liquid (e.g., a solvent), a solution (e.g., of two or more solvents or at least one solid dissolved in a solvent), a solid-liquid heterogeneous-phase mixture (e.g., a slurry), and a gas-liquid mixture (e.g., gas dissolved in a liquid).

The term "pulsing tube-side flow" means tube-specific process liquid flow rates in individual tubes of at least half of the plurality of tubes are modulated such that they independently fluctuate at least plus or minus 10 percent (%), preferably at least plus or minus 25%, and more preferably at least plus or minus 50% around the average flow rate. The tube-specific flow rate of process fluid through any one tube (e.g., 41) may or may not vary over time and may be the same as or different from the tube-specific flow rate of process fluid in any other tube.

The term "sealing" means to secure against leakage, especially leakage of a liquid such as a process fluid, heat exchange fluid, or liquid coolant (if the latter is employed). Suitable ways of securing against leakage are known in the art. Securing against leakage may be accomplished, for example, with a close tolerance dry fit, or may employ a sealing means. Examples of suitable sealing means are a gasket, o-ring, rubber dam, and substantially insoluble (in the liquid) substance (e.g., silicone-based grease). Examples of a preferred close tolerance dry fit between two elements is where one of the elements comprises a flanged portion and the other element comprises a complementary-fitting grooved or annular recessed portion (e.g., snap fit).

The phrases "sequentially pulsing a plurality of liquid flows," "sequentially pulsing the tube-side flow of the process fluid through the tubes," and the like are synonymous and mean, in an array of a plurality of tubes (e.g., 41) such as, for example, the array shown in FIG. 3, having a gaseous or, preferably, liquid substance passing therethrough, over a time period, first modulating a rate of the passage of the substance entering and passing through at least a first tube (not indicated, i.e., through the enclosed volumetric space of the first tube) at a first position (e.g., 81 or 82 in FIG. 3), then modulating a rate of the passage of the substance entering and passing through at least a second tube (not indicated, i.e., through the enclosed volumetric space of the second tube) at a second position (e.g., 83 or 84 in FIG. 3), then modulating a rate of the passage of the substance entering and passing through at least a third tube (not indicated, i.e., through the enclosed volumetric space of the third tube) at a third position (e.g., 85 or 86 in FIG. 3), et cetera so that rates of passage of the substance entering and passing through said tubes (e.g., 41) are modulated at progressively different time points in at least some of said tubes (e.g., 41). As indicated in FIG. 3, the aforementioned clockwise sweeping (see direction arrow 13 in FIG. 1) of blades 17 would sequentially pulse a plurality of liquid flows in tubes (not indicated), including, but not limited to, said flows entering and passing through tubes (not indicated) at first positions 81, 82, or both; then flows entering and passing through tubes (not indicated) at second positions 83, 84, or both; then flows entering and passing through tubes (not indicated) at third positions 85, 86, or both; then a flow entering and passing through the tube (not indicated) at fourth position 87, and then flow entering and passing through the tube (not indicated) at fifth position 88. Direction of the sequential pulsing is not critical and may be, for example, circular (e.g., via a sweeping impeller blade attached to a rotating shaft), back-and-forth (e.g., employing a blade alternately sliding left, right, left, right et cetera), zigzag, inward, outward (e.g., from a tip of the sweeping impeller blade), or a combination thereof.

In some embodiments, rotating the impeller (e.g., 16) modulates flow (e.g., changes flow rate, direction, or both) of the process fluid to at least two tubes (e.g., 41), preferably to at least a majority of the tubes (e.g., tubes 41 within theoretical circle 55), and more preferably, rotating the impeller modulates flow of process fluid to all of the tubes, all without materially increasing or decreasing total (overall) flow of process fluid out of the outlet aperture (not indicated) of the fluid outlet conduit (e.g., 25, 26, or both) of the pressure vessel body (e.g., 21) (immaterial increases or decreases of total flow of process fluid are ±2% or less, preferably ±0.5% or less, and more preferably 0% in the total process flow out of the outlet aperture are contemplated). Such modulation of flow typically is dependent on at least rate of rotation of the impeller, e.g., blade pass frequency relative to an individual tube, distance from the nearest portion (e.g., 15) of the impeller (e.g., 16) to the inlet ends (e.g., 42) of the tubes (e.g., 41), or both. In some embodiments, the rotating impeller temporarily distributes more process fluid to some tubes and temporarily denies some process fluid to other tubes as the blades pass different tubes and different times (e.g., tubes at successive first positions 81 and 82, second positions 83 and 84, third positions 85 and 86, fourth position 87, and fifth position 88). In some embodiments, some tubes temporarily experience decreased or no forward flow (from tube (e.g., 41) inlet end (e.g., 42) to outlet end (e.g., 44)) or even reverse flow of the process fluid in the tubes while forward flow of the process fluid in other tubes temporarily increases to compensate for the no forward flow or reverse flow in order to maintain a net flow rate equal to the average flow rate of the process fluid.

The impeller is rotated at a rotation speed (e.g., in revolutions per minute) so that time to plug a tube and form a first plugged tube (i.e., time to fouling) is at least 10 percent greater than, preferably at least 20 percent, more preferably at least 30 percent, still more preferably at least 40 percent, and even more preferably at least 100 percent greater than a comparison time to plug a tube and form the first plugged tube, the comparison time being determined for a comparator process lacking the sequentially pulsing step (d), i.e., when the impeller is not rotated. For present purposes, the time to fouling is determined by photographic monitoring.

The phrases "through the tubes" and through the enclosed volumetric spaces of the tubes" are synonymous.

The term "tube" means a hollow elongated, open-ended cylinder. The cylinder may be linear (i.e., "l" shaped) or curved such as, for example, "U," "S," or other curved shapes. Preferred are linear-shaped cylinders.

Preferably, the unobstructed pulsing-effective distance (e.g., $D_{pe}$, e.g., see 5 in FIG. 2)—between the nearest portion (e.g., 15) of the means for sequentially pulsing a plurality of liquid flows (e.g., 2), or the pulse-effecting portion thereof (e.g., impeller 16), and the inlet apertures (e.g., 43) of the inlet ends (e.g., 42) of the tubes (e.g., 41)—is less than or equal to 0.1 to 4.0 times an average of the inner diameters (e.g., d 57, not shown) of the inlet apertures (e.g., 43) of the inlet ends (e.g., 42) of the tubes (e.g., 41). In some embodiments, the unobstructed pulsing-effective distance is at least 0.2 times, more preferably at least 0.5 times, and still more preferably at least 1.0 times the average inner diameters of the inlet apertures (e.g., 43) of the inlet ends (e.g., 42) of the tubes (e.g., 41). In some embodiments, the unobstructed pulsing-effective distance is 3.0 times or less, more preferably 2.5 times or less, and still more preferably 1.5 times or less than the average inner diameters of the inlet apertures (e.g., 43) of the inlet ends (e.g., 42) of the tubes (e.g., 41).

Preferably, the circle (e.g., 55) circumscribed by the 360 degree sweeping of impeller blades (e.g., 17) encompasses at least half (0.5), more preferably at least two thirds (0.67), still more preferably at least three quarters (0.75), and even more preferably at least nine tenths (0.9) the inlet apertures (e.g., 43) of the inlet ends (e.g., 42) of the plurality (e.g., 248 tubes) of the tubes (e.g., 41). The circle can encompass all of the tubes, and even extend beyond an outermost tube, but, for practical reasons, not touch an outer part (e.g., pressure vessel 21) of the invention heat exchanger apparatus (e.g., 1).

As mentioned previously, the invention heat exchanger apparatus of the first embodiment includes, for example, 1-pass, 2-pass, 3-pass, and 4-pass designs, which are all generally known in the art. The 1-pass design (e.g., FIG. 1) preferably employs linear tubes (e.g., 41). Linear tubes (e.g., 41) minimize potential for fouling. Thus, 1-pass design embodiments of the invention heat exchanger apparatus (e.g., FIG. 1) are especially preferred for use with fouling-prone process fluids. Tubes (not shown) of the 2-pass design (not shown) typically have one elbow turn, e.g., are U-shaped. The 2-pass design preferably further employs at least one tube sheet (not shown). Tubes (not shown) of the 3-pass design (not shown) typically have two elbow turns, e.g., are approximately S-shaped. Preferably, the 3-pass design further employs at least two tube sheets (not shown). The 4-pass design (not shown) typically employs tubes (not shown) typically having three elbow turns. Preferably, the 4-pass design further employs at least one tube sheet (not shown). Preferably the 1-pass and 4-pass designs employ two tube sheets (not shown). Preferably, inlet ends (e.g., 42) of the tubes (e.g., 41) are flush mounted (as shown in FIG. 3) in the tube sheets (e.g., 51).

Heat exchanger apparatuses (e.g., 1) useful in the present invention can be constructed from one or more materials known for use in the art. Examples of the materials are metals (e.g., titanium), metal alloys (e.g., steel, stainless steel, and HASTELLOY® (Haynes International, Inc.) alloys), glass (e.g., a borosilicate glass), plastic (e.g., polypropylene and polytetrafluoroethylene), reinforced plastic (e.g., fiberglass reinforced plastic), and combinations thereof. An illustrative construction is as follows: pressure vessel body 21 is number 316 stainless steel, which may or may not be glass lined; tubes 41 are borosilicate glass; and tube sheets 51 and baffles 91 are polytetrafluoroethylene.

Preferably, the pressure vessel body (e.g., 21) of the shell-and-tube heat exchanger (e.g., 1) further defines a shaft-receiving aperture (not indicated) in a shaft access conduit (e.g., 22) of a pressure vessel body (e.g., 21), and the inlet apertures (e.g., 43) of the inlet ends (e.g., 42) of the tubes (e.g., 41) are disposed generally opposite from, and axially parallel to, the shaft-receiving aperture (not indicated) of the shaft access conduit (e.g., 22) of the pressure vessel body (e.g., 21); and the means for sequentially pulsing a plurality of liquid flows (e.g., 2) comprises an impeller assembly (e.g., 2) and the method of the third embodiment further comprises a further step of providing an impeller driving means (not shown) in operative connection to the drive element-receiving portion (e.g., 12, not shown) of the rotatable shaft (e.g., 10) of the impeller assembly (e.g., 2).

A pressure vessel body (e.g., 21) preferably is a component of a conventional pressure vessel. In addition to a pressure vessel body (e.g., 21), preferably the pressure vessel further comprises one or more other components such as, for example, gauges (e.g., pressure or temperature gauges or both), valves, portions for making operative connections (e.g., brackets), electronic components (e.g., electrical switches and lights), heating or cooling elements or both, a flow-modifying device (described later), baffles, sampling apertures, and viewing windows.

Preferred pressure vessel bodies (e.g., 21) comprise shells of conventional shell-and-tube heat exchangers and shell-and-tube reactors, including shell-and-tube fermentors. In some embodiments, a pressure vessel body is characterized by uni-body (i.e., single body) construction such as, for example, that of pressure vessel body 21 of FIG. 1. In some embodiments, the pressure vessel body (not shown) comprises two or more components in direct or indirect sealing operative connection with each other so as to establish a multi-component pressure vessel body (not shown). A preferred multi-component pressure vessel body for 1-pass designs comprises a hollow shell (not shown) and either a combined inlet/outlet header (not shown) or separate inlet header (not shown) and outlet header (not shown). The hollow shell has spaced apart portions (not shown) defining inlet and outlet header-receiving apertures (not shown; for respectively receiving and releasing a process fluid), the inlet and outlet header-receiving apertures being, for example, disposed proximal to each other (e.g., side-by-side separated by a common wall (not shown), as is known in the art for conventional 2-pass and 4-pass shell-and-tube designs) or disposed distal from each other (e.g., as in a hollow cylindrical shell (not shown) having spaced-apart portions (not shown) comprising inlet and outlet ends (not shown), the inlet and outlet ends respectively defining the inlet and outlet header-receiving apertures (not shown), as is known in the art for conventional 1-pass and 3-pass shell-and-tube designs). The combined inlet/outlet header has spaced apart portions defining outlet and inlet shell-receiving apertures, at least one process fluid inlet aperture, and at least one process fluid outlet aperture. The separate inlet header has spaced apart portions defining an outlet shell-receiving aperture and a process fluid inlet aperture and the separate outlet header has spaced apart portions defining an inlet shell-receiving aperture and a process fluid outlet aperture. The outlet and inlet shell-receiving apertures of any of the aforementioned combined inlet/outlet headers and separate inlet and outlet headers are in sealing operative connection to the inlet and outlet header-receiving apertures of the hollow shell, respectively.

Preferably, the tubes (e.g., 41) are axially arrayed generally parallel to each other, as is shown in FIGS. 1 and 2. Preferably, inner diameter d (not indicated) of each tube (e.g., 41) is substantially constant along axial length (not indicated) of the tube (e.g., 41). In some embodiments, the inner diameters of substantially all tubes are essentially the same. In some embodiments, the inner diameters of the tubes vary with increasing distance from a center point (not indicated) in a tube sheet (e.g., 51).

Embodiments of the means for sequentially pulsing a plurality of liquid flows other than impeller assemblies (e.g., 2) may be employed. It is not critical what is employed as the means for sequentially pulsing a plurality of liquid flows (e.g., 2) provided what is employed can be used to establish the plurality of pulsing tube-side flows of the process fluid through the tubes (e.g., 41) and establish indirect heat exchange between the process and heat exchange fluids via walls (e.g., 47) of the tubes (e.g., 41). In some embodiments, the means for sequentially pulsing a plurality of liquid flows comprises a plurality of pulsable solenoid valve devices (not shown), wherein all of the pulsable solenoid valve devices are disposed in the inlet plenum (e.g., 36) and there is at least one pulsable solenoid valve device (not shown) for every three tubes (e.g., 41). In preferred embodiments, this means for sequentially pulsing a plurality of liquid flows comprises an impeller assembly such as, for example, impeller assembly 2 or a variation thereof. The variation of impeller assembly 2 includes impeller assemblies (not shown) having, for example, fewer or more blades 17, different shaped blades (not shown) than the shape of blades 17, different pitch blades, and different length blades. For instance, flat blades (not shown) having zero pitch (not indicated) are contemplated.

Preferred impellers (e.g., 16) comprise unpitched (not shown) or pitched blade (e.g., 17) turbines, hydrofoils, or perforated discs. Examples of commercially available impellers useful in the present invention are the Lightnin A510 (LIGHTNIN, Rochester, N.Y., USA) and the Chemineer SC-3 (Chemineer, Inc., Dayton, Ohio, USA). In a more preferred embodiment, the impeller comprises a 45-degree pitched blade turbine having 2 or more blades, more preferably 2, 3 or 4 blades. In some embodiments rotation speed for the Lightnin A-310 impeller is from 140 revolutions per minute (rpm) to about 210 rpm, and more preferably from about 145 rpm to about 180 rpm.

Still more preferred is a tickler impeller as described in U.S. Pat. No. 6,955,461 B2. The tickler impeller has at least two curved blades mounted on a rotatable shaft (e.g., 10) for rotation in the inlet plenum of the inlet portion of the shell-and-tube heat exchanger such that a nearest portion of the tickler impeller, or a pulse-effecting portion thereof, is within an unobstructed pulsing-effective distance from the inlet apertures of the inlet ends of the tubes. The curved blades of the tickler impeller extend away from the inlet ends of the tubes at an angle, from a geometric plane having the inlet ends, (i.e., also referred to herein as a "chevron angle") of from 0° to less than 90°, each of the curved blades having a concave face which faces towards the inlet ends of the tubes and a convex face opposite the concave face which convex face faces away from the inlet ends of the tubes. The concave face is leading and convex face is trailing when the tickler impeller is rotated, thereby establishing the sequentially pulsable fluid communication between the means for sequentially pulsing a plurality of liquid flows, or the pulse-effecting portion thereof, and, successively, the inlet apertures of the inlet ends of the tubes, the enclosed volumetric spaces of the tubes, and the outlet apertures of the outlet ends of the tubes. In some embodiments the tickler impeller has from 2 to 12 curved blades, preferably from 3 to 12 curved blades (e.g., 3 curved blades). More preferably the curved blades are essentially of the same size and pitch as each other. In some embodiments the rotatable shaft (e.g., 10) bearing the tickler impeller further includes a hub, the curved blades being mounted to the hub and having tips opposite the hub, the tips being rounded. Preferably the curved blades extend at the angle from the geometric plane of from 0° to 75°, the curved blades having an average pitch of about 30° to about 60°, and still more preferably about 45°. Preferably the curved blades each have a height (measured by standing the curved blades on a horizontal plane at a same angle as the angle from the aforementioned geometric plane) and the tickler impeller has a diameter (measured for a theoretical circle drawn by tips of the curved blades during rotation of the tickler impeller) such that a ratio of the height-to-diameter is from 0.05 to 0.75, and more preferably about 0.2. During operation of the invention heat exchanger having the tickler impeller, the tickler impeller is characterizable as producing a significant component of flow of process fluid that is an inward-directed flow of process fluid (i.e., a flow component directed from a shell (e.g., pressure vessel body 21) of the invention heat exchanger toward an axis about which the rotatable shaft driving the tickler impeller rotates; see e.g., the pressure vessel body 21 and aforementioned axis (not indicated) about which rotatable shaft 10 in FIG. 1 would rotate). When compared to conventional radially-directed flow of process fluid obtainable with traditional impellers (e.g., 16) (i.e., a flow component directed from the axis about which the rotatable shaft (e.g., 10) driving the conventional impeller rotates toward the shell (e.g., pressure vessel body 21)), it has been discovered that the inward-directed flow of process fluid achievable with the tickler impeller advantageously translates into increased axially-directed flow of process fluid towards the inlet ends of the tubes in such a way so as to produce more evenly distributed flow rates of process fluid through the tubes when flow rates in different tubes are compared to each other. This inwardly-directed flow is significant when it leads to at least a 10% decrease in rate of fouling of the tubes compared to rate of fouling of the tubes with an impeller (e.g., 16) producing radially-directed flow. Thus, while traditional impellers work well in the invention method, tickler impellers are more preferred. An example of a preferred tickler impeller is the tickler impeller illustrated in FIG. 3 of and described in U.S. Pat. No. 6,955,461 B2; see the so-called KT-3 tickler impeller from The Dow Chemical Company, Midland, Mich. USA.

In some aspects of the method of the third embodiment produces a flow of process fluid characterizable by a significant flow component that is inwardly directed away from the shell of the heat exchanger apparatus and translates into increased axially-directed flow of process fluid towards the inlet ends of the tubes in such a way so as to produce substantially evenly distributed flow rates of process fluid through the tubes when flow rates in different tubes are compared to each other and a reduced rate of, or longer time to, fouling of the tubes.

Bearings may comprise a single component or an assembly (e.g., 14) of two or more components as is known in the mechanical stirring art.

In a preferred embodiment, the inlet plenum (e.g., 36) of the invention heat exchanger apparatus (e.g., 1) further contains a flow-modifying device (not shown; e.g., an open-ended conical-shaped element) disposed in the inlet plenum (e.g., 36) around a rotatable shaft (e.g., 10) between fluid inlet conduit (e.g., 26) in inlet portion (not indicated) of the tube-side flow pathway (not indicated) and the pulse-effecting portion (e.g., impeller 16) of the means for sequentially pulsing a plurality of liquid flows (e.g., impeller assembly 2). The flow-modifying devices preferably facilitate uniform flow of process fluid in a direction generally parallel to and towards the inlet ends (e.g., 42) of the tubes (e.g., 41). More preferably, the conical-shaped element has spaced-apart ends, one end defining a larger width opening than width of opening defined by the other end, wherein the larger width opening is disposed nearer to, and the smaller width opening is disposed further from, the tubes (e.g., 41). For example, the shell-and-tube heat exchanger 3 in FIG. 1 in a preferred embodiment further comprises the conical-shaped element (not shown) disposed with a smaller opening proximal to inlet conduit 23 and larger opening proximal to, but spaced apart from tubes 41, and rotatable shaft 10 traverses through the openings (not shown) of the conical-shaped element (not shown), so as to establish a means for directing flow of process fluid (not shown) from inlet 23 conduit, in left-to-right direction past blades 17 of impeller 16 to inlet apertures 43 of tubes 41.

Examples of preferred sources of the process fluid are reaction mixtures; condensates (e.g., from distillations, evaporations, or stripping operations); solvent containers (e.g., reboilers and storage cylinders); and filtrates.

Examples of preferred sources of the heat exchange fluid are reaction mixtures; condensates (e.g., from distillations, evaporations, or stripping operations); solvent containers (e.g., reboilers and storage cylinders); and filtrates.

It is not critical what is employed as the impeller driving means (not shown) provided what is employed can be used to establish acceptable rotation of a rotatable shaft (e.g., 10) of an impeller assembly (e.g., 2). Suitable impeller driving means are known in the art. In preferred embodiments, this impeller driving means comprises a motor, engine, turbine, or other motive force supplying means. Examples of impeller driving means are electric mixer heads and air-powered mixer heads provided by LIGHTNIN, Rochester, N.Y., USA.

Additional aspects of the method of the third embodiment further provide a liquid pushing means (not shown) in operative connection to the inlet aperture (not indicated) of a fluid inlet conduit (e.g., 23, 24, or both) of the pressure vessel body (e.g., 21) to establish fluid communication between a source of a process fluid (not shown) and the tubes (e.g., 41). Preferred liquid pushing means are centrifugal pumps such as those provided by Gould Pumps (ITT Corporation, Seneca Falls, N.Y., USA) and gear pumps such as those provided by Viking Pump, Inc., Cedar Falls, Iowa, USA.

In the method of heat exchange of the third embodiment, the invention heat exchanger apparatus of the first embodiment (e.g., 1) can be employed in any orientation such as with the rotatable shaft (e.g., 10) of the impeller assembly (e.g., 2) and the tubes (e.g., 41) disposed in a vertical, horizontal, or any orientation therebetween. The horizontal orientation of the invention heat exchanger apparatus is what is shown in FIGS. 1 and 2.

It is known in the art that shape of an impeller determines flow characteristics of a fluid in which the impeller is moving. The flow characteristics of the fluid vary with fluid properties, impeller blade shape and impeller rotation rate. An axially rotated impeller generates a circulation flow having an axial-flow component parallel to the axis of rotation (i.e., moving down the axis of rotation, e.g., from drive element-receiving end 11 towards blade element-receiving end 12 (not shown) of rotatable shaft 10).

Such an axial-flow generating impeller can be operated in an invention heat exchanger apparatus, the axial-flow generating impeller being operated at a circulation flow rate wherein the axial-flow component thereof into a specific tube is greater than, equal to, or less than the pumping flow rate into the fluid inlet conduit (e.g., 23, 24, or 23 and 24) of the heat exchanger apparatus (e.g., 1). According to the superposition principle, the axial-flow component of the circulation flow rate and the pumping flow rate are additive in a specific tube, but average flow rate of process fluid is unaffected. The combined flow rates are also referred to herein as the average flow rate for the process fluid.

Thus, the effect of adding the impeller assembly (e.g., 2) induced flow to a pump-pressurized flow of process fluid (e.g., via the liquid pushing means, not shown) is to create a pulsing effect in the tubes (e.g., 41). However, even where the circulation flow rate lacks an axial-flow component, a pulsing effect can be achieved via alternating between blocking and unblocking flow of process fluid into the tubes (e.g., 41).

Preferably, the pulsing effect provides at least one benefit to the method of the third embodiment wherein the benefit is, for example, decreased fouling rates (e.g., by virtue of a continuous self-cleaning of the tubes, thereby inhibiting accumulation of solids or second liquid layers that may be suspended in a process fluid); improved heat exchange rates (e.g., by resulting repeated renewing of thermal boundary layer in the tubes due to pulsing effect and different tube-specific flow rates), or a combination thereof, all as described herein.

Preferably, process fluid is pushed at an average flow rate and tube-specific flow rates in at least two tubes (e.g., 41) independently are from about 0.1 times to about 5.0 times the average flow rate, wherein the average flow rate equals an average of the tube-specific flow rates in all of the tubes (e.g., 41). The tube-specific flow rate of process fluid through any one tube (e.g., 41) may or may not vary over time and may be the same as or different from the tube-specific flow rate of process fluid in any other tube (e.g., 41).

In some embodiments of the method of the third embodiment, the process fluid in the tubes (e.g., 41) is characterized by a Reynolds number ranging from about 1 to about 10,000, more preferably from about 10 to about 2300, and still more preferably from about 10 to about 100. The Reynolds number is a dimensionless number commonly designated by the symbol $N_{Re}$ and calculated according to the following equation:

$$N_{Re} = (DV\rho) \text{ divided by } \mu$$

where $N_{Re}$ is the Reynolds number, D is tube inner diameter, V is fluid velocity, $\rho$ is fluid density, and $\mu$ is fluid viscosity.

Different heat exchange fluids (also known in the art as heat transfer fluids) useful in the method of the third embodiment may have same or different characteristics from each other. These characteristics include chemical composition, density, viscosity, stability to heat, melting or freezing point temperature, and boiling point temperature. Examples of suitable heat exchange fluids useful in the invention method are antifreeze, glycols (e.g., DOWTHERM™ SR-1, The Dow Chemical Company, Midland, Mich. USA), oils (e.g., engine oil), water (e.g., chilled water, ambient temperature water, or steam), and refrigerants (e.g., air, ammonia, water, carbon dioxide, and chlorofluorocarbons).

Different process fluids useful in the method of the third embodiment may have same or different characteristics from each other. These characteristics include chemical composition, stability to heat, melting or freezing point temperature, boiling point temperature, density, viscosity, or both of process fluid; amount, if any, and relative densities of solids present in process fluid; and amount, if any, and relative densities of second liquid layer present in process fluid. Such amounts can increase (or decrease) in the tubes (e.g., 41) over time by accumulation. Examples of useful process fluids are suspensions (e.g., heterogeneous catalyst mixtures), polymerizable compounds (e.g., reactants or olefinic monomers (e.g., acrylic acid and derivatives thereof), slurries, emulsions, and dispersions (e.g., latexes).

Different heat exchange methods of the third embodiment may employ different operating conditions. Examples of such operating conditions are temperature, pressure (e.g., inlet plenum pressure), orientation (e.g., vertical, horizontal, and the like) of the invention heat exchanger apparatus (e.g., 1), especially the tubes (e.g., 41), and fluid flow rates. Examples of useful operating conditions are temperatures from −100 degrees Celsius (° C.) to 300° C.; and pressures from 10 kiloPascals (kPa) to 20,000 kPa.

The method of the third embodiment preferably allows establishment of any one or more of a range of pulsed process fluid flow characteristics (e.g., rate, pulse interval, pulse intensity) within the tubes (e.g., 41) wherein the characteristics are optimal for improving method performance based on the particular process fluid characteristics and operating conditions being employed thereby. The pulsed process fluid flow characteristics can be adjusted by, for example, varying motive force produced by the means for sequentially pulsing a plurality of liquid flows (e.g., varying rotation rate of impeller 16), varying length, shape, or pitch of the means for sequentially pulsing a plurality of liquid flows (e.g., varying length, shape, or pitch of blade 17), varying motive force applied to process fluid or heat exchange fluid (e.g., varying pumping rates thereof), varying numbers of tubes (e.g., increasing or decreasing number of tubes 41), varying the unobstructed pulsing effective distance (e.g., varying the unobstructed pulsing effective distance $D_{pe}$ (not shown) between nearest portion 15 of blades 17 and inlet apertures 43 of inlet ends 42 of tubes 41, and varying dimensions (e.g., inner diameter or length) of the tubes (e.g., 41) to suit particular circumstances. Such adjustment capability is especially valuable wherein particular operating conditions change over a period of time. Such adjustments would beneficially allow, for example, for improved heat transfer, for sweeping any particulates or other material from inlet plenum, tubes, outlet plenum, or a combination thereof, especially from any hold up areas therein, especially material held up in the tubes (e.g., 41); or a combination thereof.

In some embodiments, the method of the second embodiment is characterized by a rate of fouling of at least two tubes, preferably a majority of the tubes, more preferably all of the tubes, and the rate of fouling is reduced by at least 10%, more preferably by at least 25%, still more preferably by at least 50%, and even more preferably by at least 75%, compared to a comparison rate of fouling of a comparator process lacking the sequentially pulsing step (d). For present purposes, the rate of fouling is determined by photographic or visual monitoring of flow through tubes or, more commonly by monitoring degree of pressure increase at constant flow rate of process fluid or by monitoring degree of decreased flow rate of process fluid at constant pressure. For example for a fixed pump pressure and a fixed number X of tubes initially having a total flow rate Y of process fluid through all X tubes and an average flow rate through one tube of Y/X, when flow rate Y decreases by 1/X such that the decreased total flow rate equals Y−(Y/X), an equivalent of one tube is fouled, when flow rate Y decreases by 2/X such that the decreased total flow rate equals Y−(2Y/X), an equivalent of two tubes are fouled, and so on.

A person of ordinary skill in the art would be able to determine appropriate aspects (e.g., tube length, diameter, or both), materials (e.g., for the invention heat exchanger apparatus and fluids), features (baffles or no baffles, flow-modifying device or none), and conditions (e.g., operating temperature) useful in the present invention under particular circumstances without undue experimentation.

The following example(s) are provided to further illustrate, but not limit scope of, the present invention.

EXAMPLE(S) OF THE PRESENT INVENTION

Example 1

Simulated Operation of and Calculated Data for Simulated Heat Exchanger Apparatus The simulated heat exchanger apparatus has 3.627 meters long tubes, each tube having an inner diameter of 0.0148 meters (14.8 millimeters). To increase computational efficiency, however, only a 0.406 meter (16 inches) long portion of the tubes are directly simulated, leaving a 3.221 meter long truncated portion of the tubes that will be indirectly simulated using a method described in the next paragraph. FIG. 4 shows geometry and dimensions of a portion of the simulated heat exchanger apparatus.

The portion of the simulated heat exchanger apparatus of FIG. 4 is simulated using the Computational Fluid Dynamics ("CFD") computer software package FLUENT® 6.3.26, a product of ANSYS Inc., 275 Technology Drive, Canonsburg, Pa., U.S.A. Before performing the simulation, a computational domain that has the same geometry and dimensions as the simulated heat exchanger apparatus is built and discretized into small computational cells using the commercial grid-generation computer software package GAMBIT®, a product of ANSYS Inc., 275 Technology Drive, Canonsburg, Pa., U.S.A. The resulting computational mesh is then loaded into the FLUENT® 6.3.26 package. Fluid density and viscosity are defined as input parameters in the FLUENT® 6.3.26 package. Operational conditions including mass flow rate and impeller rotational speed are prescribed as boundary conditions at the corresponding boundaries. A pressure outlet boundary condition is employed at a tube outlet surface (right end surfaces in FIG. 4) with a prescribed constant pressure. A "porous jump" model (FLUENT® 6.3 user's guide, FLUENT Inc., 2006) with a pressure jump coefficient of 2.5 per meter ($m^{-1}$) is positioned 0.318 meters (21.5 times tube inside diameter) downstream of the tube inlet surface to model pressure drop in the 3.221 meters long truncated portion of the tubes. Specific physical models and numerical schemes for solving the 3-dimensional (3-D) time-dependent Navier-Stokes equations are selected, as described below. Table 1 summarizes the operational conditions and material properties inputted into the FLUENT® 6.3.26 package for this simulation/calculation.

TABLE 1

| Parameters | Value |
| --- | --- |
| Simulated Heat Exchanger Apparatus Inlet plenum inner diameter in meters (m) | 0.438 |
| Impeller Diameter (m) | 0.311 |
| Impeller Distance from Tube Inlet (m) | 0.013 |
| Impeller Rotational Speed (rpm) | 300 |
| Tube inner diameter (m) | 0.015 |
| Number of Tubes employed | 248 |
| Slurry Flow Density in kilograms per cubic meter ($kg/m^3$) | 1656 |
| Slurry Flow Viscosity in Pascal-seconds (Pa-s) | 0.002 |
| Total Flow Rate in kilograms per second (kg/s) | 17.9 |
| Average Flow Rate per Tube (kg/s) | 0.072 |

FIG. 4 shows a simulated "self-cleaning/pulsating heat exchanger" configuration embodiment using the exemplified CFD simulation, in which the Lightnin A310 impeller is positioned 0.013 meters (the distance being less than the inside diameter of the tube which is 0.0148 m) away from the tube inlets with the impeller rotating at 300 rpm to potentially keep hypothetical solid particles (average diameter of less than 1 millimeter) suspended in the inlet plenum (not shown) and provide pulsating flow in the tubes. A uniform slurry flow enters an inlet plenum of the simulated heat exchanger apparatus from the left, flows through 248 tubes at a uniform velocity of 0.254 meter per second (m/s) (0.072 kilograms per second (kg/s)) and is heated by heat exchange fluid on the shell side. In this CFD model, the 3-D, time-dependent Navier-Stokes equations for turbulent flows (*Chapter 2: Fundamental Equations of Compressible Viscous Flow, Viscous Fluid Flow*, White F M, 1991, pages 59-100) are solved using the Unsteady Reynolds Averaged Approach (URAN; Iaccarino G., et al., *Reynolds averaged simulation of unsteady separated flow*, International Journal of Heat and Fluid Flow, 2003; 24:147-156). The Reynolds-Stress model (*Chapter 11: Reynolds Stress and Related Models, Turbulent Flows*, Pope S B, 2000, pages 387-462) is used to calculate the Reynolds stresses in the Reynolds Averaged Navier-Stokes equations. The sliding-mesh technique Fluent 6.3 user's guide, supra) is used to simulate the rotation of the impeller, where the impeller is enclosed by a rotational mesh zone that has a diameter of 0.372 meters and height of 0.071 meters. The right-end face of the rotational mesh zone is positioned 0.0065 meters away from the tube inlet surface (e.g., annular faces 49 (not indicated) of inlet ends 42 of tubes 41). Relatively fine computational cells with the size of 0.8 millimeter (mm) are positioned between the impeller and the tube inlet. The cell size increases by a factor of 1.1 in the inlet plenum, in a direction moving away from the impeller (i.e., right to left). The mesh for the complete domain shown in FIG. 4 consists of approximately 7.7 million cells. A second order upwind discretization scheme (Tanneheill J C et al., *Chapter 3: Basics of Discretization Methods, Computational fluid mechanics and heat transfer*, 1997, pages 45-96) defines second order accuracy and is used both in time and space to solve the Navier-Stokes equations for better numerical accuracy (numerical error proportional to the square of the computational cells size and the integration time-step size). The time-dependent equations are integrated with a time-step of 0.0001 second. The time-variation of the flow rate for tubes #1 through #8 is monitored throughout the simulation.

FIG. 5 shows a snapshot of the instantaneous velocity vectors at the center plane crossing tubes #1 to #8. The velocity magnitude of the flow is denoted both by the grey scale and lengths of the velocity vectors. It shows that the discharge from the impeller is predominately along the axial direction. The flow velocity in tubes varies with their position relative to the blades. Different velocity distributions are therefore observed in the top and lower halves of a center plane.

FIGS. 6a and 6b present the simulated time-variation of flow rates through two tubes (numbers 4 and 6, respectively) with different distances from theoretical centerline of the simulated heat exchanger apparatus. Using the last three pulsations, a mean flow rate and the fluctuation magnitude are calculated. The relative fluctuation defined as (maximum flow rate−minimum flow rate)/mean flow rate is found to be 7.8 percent (%), 11%, and 25% for tubes numbered 3, 4, 6 and 7 (in FIG. 5), respectively. The fluctuation magnitude may be further increased by using an optimized impeller for this application.

Example 2

Pilot Heat Exchanger System Design and Testing

Setup: All tests are conducted using a pilot heat exchanger system comprising a shell-and-tube heat exchanger, centrifugal pump (for pumping slurry), 3 sections of tubing, agitatable feed tank (for holding a slurry in an agitated state), two stirrer motors, first rotatable stir shaft, first impeller, and support structures. A photographic system is also employed. The shell-and-tube heat exchanger comprises an open-ended glass cylinder, inlet and outlet headers, 7 tubes, inlet and outlet tube sheets, second rotatable stir shaft, and second impeller. The open-ended glass cylinder has an inside diameter that is 4 inches (10.2 centimeter (cm)) and a length of 35 inches (88.9 cm) and comprises a portion of the shell of the shell-and-tube heat exchanger. The open ends of the glass cylinder are inlet and outlet ends. Each of the seven tubes is disposed horizontally and substantially parallel to each other. Each of the seven tubes is ⅜ inch (0.95 cm) in diameter, with ⅛ inch (0.32 cm) thick walls. The tubes are arranged in two concentric rings of three tubes each and a single center tube, as shown in FIG. 7. In FIG. 7, three tubes 120 are arranged in outer concentric ring (a), three tubes 120 in inner concentric ring (b), a single tube 120 in center (c) of glass cylinder 110. Radial positions of the two concentric rings are two inches (5.1 cm) from center, and three inches (7.6 cm) from center, respectively. This tube positioning is chosen so as to maintain a fairly uniform distribution of the tubes inside the enclosed volumetric space of the glass cylinder and to provide an unhindered photographic view of the tubes. The inlet and outlet headers of the heat exchanger are respectively sealably attached to the inlet and outlet ends of the glass cylinder and inlet and are proximal to the tube sheets, which are disposed inside the glass cylinder proximal to the inlet and outlet ends thereof. The inlet header has a bell shape and a cylindrical profile near the inlet tube sheet where the second impeller that is attached to an end of the second rotatable shaft is located, and a tapered profile that decreases appropriately so as to form a seal around the second rotatable shaft. The second rotatable shaft is disposed essentially perpendicular and spaced apart from the center of the inlet tube sheet. A flow inlet aperture is disposed in the inlet header distal from the inlet tube sheet so as to prevent almost all of the slurry from flowing directly from the flow inlet aperture into inlets of the tubes nearest the flow inlet aperture, i.e., from flowing to the inlets of the nearest tubes without encountering the second impeller. The outlet header also is bell shaped and has a cylindrical profile. The outlet header has a flow outlet aperture disposed therein.

For each test, slurry flow is maintained using a recirculation system that includes a 1 gallon (3.8 liters (L)) agitatable feed tank and a centrifugal pump to induce flow through the pilot heat exchanger system. Two sections of tubing respectively provide fluid communication from the agitatable feed tank to the centrifugal pump and from there to the flow inlet aperture of the inlet header of the shell-and-tube heat exchanger. A third section of tubing provides fluid communication from the flow outlet aperture of the outlet header to the agitatable feed tank. This allows for a consistent slurry mixture to pass from the agitatable feed tank through the pilot heat exchanger system and back to the agitatable feed tank, and so on. One of the stirrer motors is operatively attached to the second impeller, which is disposed within the inlet header. The other of the stirrer motors is attached to an end the first rotatable shaft, which in turn is attached at its other end to the first impeller, which is disposed within the agitatable feed tank, and these together are operable for agitating contents (e.g., a flowable slurry) of the agitatable feed vessel. The pilot heat exchanger system provides flexibility to change desired variables such as the flow rate, slurry concentration, impeller type, and impeller speed. These variables are individually tested to determine optimal running conditions of the pilot heat exchanger system under the circumstances (e.g., temperature, slurry composition and concentration, slurry physical characteristics such as, for example, viscosity, slurry flow rate, and the like).

Table 2 lists dimensions of second impellers tested. In Table 2 "PBT" means a pitched blade turbine, which is shown in the photograph of FIG. 8a; the Lightnin A310 impeller is as described previously and shown in the photograph of FIG. 8b, and the KT-3 is shown in the photograph of FIG. 8c and is an embodiment of the tickler impeller described previously. The KT-3 tickler impeller has a chevron angle of 0°.

TABLE 2 second impeller dimensions and clearances in inches (cm)

| Second impeller Type | two-blade PBT | Lightnin A-310 | KT-3 |
|---|---|---|---|
| Second impeller Diameter | 3.5 (8.9) | 3.4 (8.6) | 3.5 (8.9) |
| Second impeller/inlet tube sheet clearance* | 0.5-0.75 (1.3-1.9) | 0.5-0.75 (1.3-1.9) | 0.5-1.0 (1.3-2.5) |

*second impeller/inlet tube sheet clearance is the unobstructed pulsing-effective distance $D_{pe}$ (e.g., analogous to 5 in FIG. 2) for the second impeller. Clearance values are adjusted for essentially optimal performance of the different second impeller types under the circumstances.

Table 3 lists dimensions for tubes, glass cylinder, centrifugal pump, agitatable feed tank, and tubings.

TABLE 3 tube and glass cylinder dimensions:

| Part | Dimension | units |
|---|---|---|
| Tube Outside Diameter | 0.5 (1.3) | Inches (cm) |
| Tube Inside Diameter | 0.375 (0.95) | Inches (cm) |
| Tube Length | 36 (91) | Inches (cm) |
| Glass cylinder Diameter | 4 (10.2) | Inches (cm) |
| Glass cylinder Length | 35 (89) | Inches (cm) |
| Centrifugal Pump Flow Capacity | 25 | Liters/minute |
| Agitatable Feed Tank Size | 1 (3.8) | Gallon (L) |
| Tubing outside Diameter | 0.75 (1.9) | Inches (cm) |

Slurry Testing: In order to determine effectiveness of the pilot heat exchanger system at preventing slurry buildup, a mixture of solid resin particles (volume median particle size of 300 micron) and water is tested across a variety of operating conditions. Several tests are conducted at solids weight concentrations between 5 wt % and 10 wt %, based on total weight of the test slurry. Slurry testing shows how the shell-and-tube heat exchanger handles solids passing through the inlet header and 7 tubes. The slurry used for the bulk of testing is created by suspending 5 wt % resin particles in water. The particles have an apparent density of 1.44 grams per cubic centimeters (g/cc) and thus are much heavier than the water that suspends them. The tests are conducted as a variety of variables are changed at each concentration, with a focus on second impeller type and rotation speed in the inlet header of the shell-and-tube heat exchanger. For every test, a non-agitated trial is compared against a range of second impeller speeds from 60 revolutions per minute (rpm) up to 400 rpm in the inlet header of the shell-and-tube heat exchanger.

To maintain a uniform suspension of the solid resin particles in a slurry, the solid resin particles (solids) are mixed with the first rotatable shaft/first impeller in the agitatable feed tank. Any settling is thus forced to occur in the shelland-tube heat exchanger so as to model what would happen in a plant when a slurry is drained from a reactor. Based on the results of each set of tests, variables are individually changed to try and isolate the effects of each variable. A goal of the slurry tests is to optimize the design and operating variables of the shell-and-tube heat exchanger.

Without agitation, there is settling of the solid resin particles in the headspace and the tubes. The concentration of the solid resin particles is consequently much higher in the bottom tubes, and much lower in the upper tubes. This settling and resulting uneven concentration of the solid resin particles is indicative of a flow maldistribution condition in the tubes. Ultimately this leads to solid resin particles plugging the bottom tubes. Under agitation of the second impeller, the solid resin particles remain suspended inside the inlet header as a result of the impeller motion. This provides a more uniform concentration of the solid resin particles through each of the tubes, and in some cases, prevents any buildup of the solid resin particles in the tubes altogether, which buildup undesirably could lead to clogging of one or more of the tubes.

An adjustable variable in preventing clogging of the tubes is the second impeller rotation speed. Because the second impeller also serves to force flow into the tubes, it also acts as a pump in some ways. If the second impeller rotation speed is high enough, it begins to pump more fluid than is provided by the centrifugal pump feeding the slurry through the flow inlet into the inlet header. This causes slurry flow to be reversed through at least one tube of the shell-and-tube heat exchanger in Example 2. Preferably rotation speed of the second impeller is maintained at or below a maximum value for the rotation speed at which the reversal of flow (backflow) of slurry in one of the tubes begins, which maximum value exists for each set of test conditions.

Table 4 shows effect of second impeller rotation speed on time to plug or block one of the seven tubes using the Lightnin A-310 impeller at the unobstructed pulsing-effective distance $D_{pe}$ for the Lightnin A-310 impeller listed in Table 2.

TABLE 4

Lightnin A-310 impeller rotation speed (rpm) and time to plug or block a tube

| Impeller rotation speed (rpm) | Time to plug a tube (minutes) |
|---|---|
| 0 | 5 (comparison time) |
| 120 | 3.5 |
| 140 | 6.5 |
| 145 | 8 |
| 150 | >30 |
| 160 | >30 |
| 170 | >30 |
| 180 | >30 |
| 210 | 8 |

Operation of the invention heat exchanger apparatus of the first embodiment produces the tube-side sequentially pulsed-flow of the process fluid and, thereby, provides improved heat exchange rates between the heat exchange fluid and the process fluid and decreased fouling of the tubes and other aspects of the invention heat exchanger apparatus when employing fouling prone process fluids (e.g., suspensions and mixtures comprising a polymerizable monomer such as unsaturated olefin (e.g., acrylic acid)). The heat exchanger apparatus of the first embodiment operates by maintaining average flow rate of the process fluid and only locally varies tube-specific flow rates of the process fluid moving through the tubes (e.g., 41). Further, when the fouling prone process fluid comprises a suspension of solid particles in a liquid, pulsing flow of process fluid (e.g., by rotation of blades 17) inhibits agglomeration of any solid particles or, perhaps, effects deagglomeration of any agglomerated solid particles, in the inlet plenum (e.g., 36) before the solid particles reach the tubes (e.g., 41), in the tubes (e.g., 41), in the outlet plenum (e.g., 37), or a combination thereof.

While the present invention has been described above according to its preferred aspects or embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A chemical processing system comprising a means for heat exchange between a process fluid and a heat exchange fluid, the means for heat exchange comprising:
   a heat exchanger apparatus which includes a plurality of tubes, the tubes being open-ended and defining enclosed volumetric spaces between the open ends thereof, and a portion of the heat exchanger apparatus defines a shell-side flow pathway therethrough and another portion of the heat exchanger apparatus defines a tube-side flow pathway therethrough, the tube-side flow pathway comprising the enclosed volumetric spaces of the tubes;
   a source of the process fluid comprising a liquid;
   a process fluid effluent receiving means;
   a source of the heat exchange fluid; and
   a heat exchange fluid effluent receiving means,
   wherein the source of the heat exchange fluid is in sequential fluid communication with the shell-side flow pathway in the heat exchanger apparatus and the heat exchange fluid effluent receiving means; the source of the process fluid is in sequential fluid communication with the tube-side flow pathway in the heat exchanger apparatus and the process fluid effluent receiving means; the shell-side and tube-side flow pathways are in indirect heat exchange communication with each other via the walls of the tubes; and the shell-side and tube-side flow pathways lack fluid communication with each other wherein the heat exchanger apparatus further comprises a means for sequentially pulsing a plurality of liquid flows therein, and the means for sequentially pulsing a plurality of liquid flows being in sequentially pulsable fluid communication with the enclosed volumetric spaces of at least two of the tubes wherein:
   (a) the portion of the heat exchanger that defines the shell-side flow pathway comprises a shell defining spaced-apart shell-side fluid inlet and outlet conduits and an enclosed volumetric space, the shell-side fluid inlet conduit being in sequential fluid communication with the enclosed volumetric space of the shell and the shell-side fluid outlet conduit, thereby establishing the shell-side flow pathway;
   (b) the portion of the heat exchanger that defines the tube-side flow pathway comprises spaced-apart tube-side inlet and outlet portions and the plurality of tubes, the tube-side inlet portion defining a tube-side fluid inlet conduit and an inlet plenum, the tube-side outlet portion defining a tube-side fluid outlet conduit and an outlet plenum, the process fluid entering the inlet plenum pump-pressurized and flowing at a pumping flow rate, the tubes having walls and spaced-apart inlet and outlet ends respectively defining inlet and outlet apertures therein, the walls of the tubes defining the enclosed volumetric spaces thereof and having inner diameters, the tubes being spaced apart from each other and contained within the enclosed volumetric space of the shell, the tube-side fluid inlet conduit being in sequential fluid communication with: the inlet plenum; the inlet apertures, enclosed volumetric spaces, and outlet apertures of the tubes; the outlet plenum; and the tube-side fluid outlet conduit, thereby establishing the tube-side flow pathway; and (c) the means for sequentially pulsing a plurality of liquid flows comprises at least one impeller blade which is moved so as to temporarily distribute more process fluid to some tubes and to temporarily distribute less process fluid to other tubes while maintaining a net flow rate of the plurality of the tubes at the pumping flow rate, the at least one blade is disposed in the inlet plenum of the inlet portion of the heat exchanger such that a nearest portion of the at least one blade is within an unobstructed pulsing-effective distance from the inlet apertures of the inlet ends of the tubes and oriented perpendicularly to the length of the tubes, thereby establishing sequentially pulsable fluid communication between the means for sequentially pulsing a plurality of liquid flows, or the pulse-effecting portion thereof, and, successively, the inlet apertures of the inlet ends of the tubes, the enclosed volumetric spaces of the tubes, and the outlet apertures of the outlet ends of the tubes wherein the unobstructed pulsing-effective distance between the nearest portion of at least one blade and the inlet apertures of the inlet ends of the tubes is less than or equal to 0.1 to 4.0 times an average of the inner diameters of the inlet apertures.

2. The system as in claim 1, wherein the tube-side inlet portion further defines a shaft access conduit and the means for sequentially pulsing a plurality of liquid flows comprises an impeller assembly, the impeller assembly comprising a rotatable shaft, bearing, and impeller, the impeller comprising the pulse-effecting portion of the impeller assembly and having at least two blades, each blade having a nearest portion that is within the unobstructed pulsing-effective distance to the inlet apertures of the inlet ends of the tubes, the bearing having a portion defining a shaft receiving aperture and having an exterior contacting surface, the portion defining the shaft receiving aperture being in sealing, low-friction operative contact to the rotatable shaft and the exterior contacting surface being in operative contact to the tube-side inlet portion at the shaft access conduit.

3. The system as in claim 1, wherein the heat exchanger further comprises at least one baffle, the baffle being disposed in the portion that defines the shell-side flow pathway in the enclosed volumetric space of the shell.

4. The system as in claim 2, wherein the impeller is a tickler impeller, the tickler impeller having at least two curved blades mounted on the rotatable shaft for rotation in the inlet plenum of the inlet portion of the heat exchanger such that a nearest portion of the tickler impeller, or a pulse-effecting portion thereof, is within an unobstructed pulsing-effective distance from the inlet apertures of the inlet ends of the tubes; the curved blades of the tickler impeller extending away from the inlet ends of the tubes at an angle, from a geometric plane having the inlet ends, of from 0° to less than 90°, each of the curved blades having a concave face which faces towards the inlet ends of the tubes and a convex face opposite the concave face which convex face faces away from the inlet ends of the tubes; the concave face leading and convex face trailing when the tickler impeller is rotated, thereby establishing the sequentially pulsable fluid communication between the means for sequentially pulsing a plurality of liquid flows, or the pulse-effecting portion thereof, and, successively, the inlet apertures of the inlet ends of the tubes, the enclosed volumetric spaces of the tubes, and the outlet apertures of the outlet ends of the tubes.

5. A method of exchanging heat between a process fluid and a heat exchange fluid, the method comprising steps of:
(a) providing the chemical processing system of claim 1;
(b) passing the heat exchange fluid from the source of the heat exchange fluid through the shell-side flow pathway of the heat exchanger apparatus to the heat exchange fluid effluent receiving means, all of the chemical processing system, thereby establishing a shell-side flow of the heat exchange fluid through the heat exchanger apparatus;
(c) simultaneously with step (b), pushing the process fluid from the source of the process fluid through the tube-side flow pathway of the heat exchanger apparatus to the process fluid effluent receiving means, all of the chemical processing system, thereby establishing a tube-side flow at an average flow rate of the process fluid through the heat exchanger apparatus, wherein each tube independently is characterized as having a tube-specific flow rate of the process fluid therethrough; and
(d) sequentially pulsing the tube-side flow of the process fluid through the enclosed volumetric spaces of the tubes of the heat exchanger apparatus of the chemical processing system, the pushing and sequentially pulsing together thereby establishing a plurality of sequentially-pulsed, tube-side flows of the process fluid through the enclosed volumetric spaces of the tubes and steps (b) and (c) together establishing an indirect exchange of heat between the process fluid and the heat exchange fluid via the walls of the tubes of the heat exchanger apparatus.

6. The method as in claim 5, wherein the process fluid is pushed at an average flow rate and tube-specific flow rates in at least two tubes independently are from about 0.1 times to about 5.0 times the average flow rate.

7. The method as in claim 5, wherein the process fluid in the tubes is characterized by a Reynolds number ranging from about 1 to about 10,000.

8. The method as in claim 5, the method producing a flow of process fluid characterizable by a significant flow component that is inwardly directed away from the shell of the heat exchanger apparatus and translates into increased axially-directed flow of process fluid towards the inlet ends of the tubes in such a way so as to produce substantially evenly distributed flow rates of process fluid through the tubes when flow rates in different tubes are compared to each other and the reduced rate of, or longer time to, fouling of the tubes, respectively.

9. A heat exchanger for exchanging heat between a process fluid and a heat exchange fluid, the heat exchanger comprising:
a tube-side flow pathway; an inlet plenum and a plurality of tubes defines the tube-side flow pathway; each of the plurality of tubes includes an inlet aperture and an inner diameter;
a source of the process fluid; the process fluid entering the inlet plenum pump-pressurized and flowing at a pumping flow rate; the source of the process fluid is in sequential fluid communication with the tube-side flow pathway in the heat exchanger apparatus;
an impeller is carried within the inlet plenum; the impeller includes an impeller blade oriented perpendicularly to the length of the tubes; the impeller rotates whereby the impeller blade temporarily distributes more process fluid to some of the plurality of tubes and temporarily distributes less process fluid to other of the plurality of tubes while maintaining a net flow rate of the plurality of tubes at the pumping flow rate.

10. The heat exchanger of claim 9, further comprising an unobstructed pulsing-effective distance is defined as the distance between the impeller and the inlet aperture; the unobstructed pulsing-effective distance is less than or equal to 0.1 to 4.0 times an average of the inner diameters of the plurality of tubes.

11. The heat exchanger of claim 9, wherein both the impeller and the pump provide a motive force to the process fluid.

12. The heat exchanger of claim 11, a backflow speed is defined as the speed of rotation at which the impeller moves more fluid than is provided by the pump; the impeller rotates at or below the backflow speed.

* * * * *